US012736648B2

(12) United States Patent
Fujitani

(10) Patent No.: US 12,736,648 B2
(45) Date of Patent: Sep. 15, 2026

(54) DATA PROCESSING SYSTEM IN WHICH DISTANCE MEASUREMENT IS PERFORMED, CONTROL METHOD THEREFOR, AND STORAGE MEDIUM

(71) Applicant: CANON KABUSHIKI KAISHA, Tokyo (JP)

(72) Inventor: Koshi Fujitani, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 295 days.

(21) Appl. No.: 18/669,720

(22) Filed: May 21, 2024

(65) Prior Publication Data

US 2024/0411002 A1 Dec. 12, 2024

(30) Foreign Application Priority Data

Jun. 6, 2023 (JP) ................................ 2023-093243

(51) Int. Cl.
*G01S 11/06* (2006.01)
*G01S 5/02* (2010.01)
*G06F 3/12* (2006.01)
*G06F 17/18* (2006.01)
*H04W 64/00* (2009.01)

(52) U.S. Cl.
CPC ............ *G01S 11/06* (2013.01); *G06F 3/1292* (2013.01); *G06F 17/18* (2013.01); *H04W 64/00* (2013.01); *G01S 5/021* (2013.01)

(58) Field of Classification Search
None
See application file for complete search history.

(56) References Cited

U.S. PATENT DOCUMENTS

| | | | | |
|---|---|---|---|---|
| 2019/0124473 A1* | 4/2019 | Yoshida | ................ | H04W 64/00 |
| 2022/0256494 A1* | 8/2022 | Hasegawa | ............. | H04W 64/00 |

(Continued)

FOREIGN PATENT DOCUMENTS

| | | | | |
|---|---|---|---|---|
| CN | 118688712 A * | 9/2024 | ........... | G01S 5/0294 |
| JP | 2019178874 A | 10/2019 | | |
| JP | 2024129448 A * | 9/2024 | .............. | H04W 8/00 |

*Primary Examiner* — Rafael Pérez-Gutiérrez
(74) *Attorney, Agent, or Firm* — ROSSI, KIMMS & McDOWELL LLP

(57) ABSTRACT

A data processing system capable of improving accuracy of distance measurement using wireless communication. In the system, a first image forming apparatus performs, with a mobile terminal, first wireless communication and second wireless communication for performing distance measurement with accuracy higher than the first wireless communication, and a second image forming apparatus performs, with the mobile terminal, the first wireless communication only. In the mobile terminal, received radio wave intensity of the second image forming apparatus in the first wireless communication with the second image forming apparatus, is substituted into a distance calculation equation obtained using the received radio wave intensity of the first image forming apparatus in the first wireless communication and on a result of distance measurement by the second wireless communication performed with the first image forming apparatus, thereby calculating a distance from the mobile terminal to the second image forming apparatus.

13 Claims, 26 Drawing Sheets

(56) References Cited

U.S. PATENT DOCUMENTS

| | | | | |
|---|---|---|---|---|
| 2024/0303006 | A1* | 9/2024 | Fukui .................... | G06F 3/1238 |
| 2024/0303016 | A1* | 9/2024 | Imine .................... | G06F 3/1292 |
| 2024/0311060 | A1* | 9/2024 | Wakabayashi ........ | G06F 3/1292 |
| 2024/0333847 | A1* | 10/2024 | Koshigaya ......... | H04N 1/00427 |

* cited by examiner

100
INTERNET
107
WIRELESS LAN TERMINAL
108 Wi-Fi
109 Wi-Fi
101
121
UWB
111
BLE
115
BLE
105
106
UWB
122
BLE
112
102
BLE
113
UWB
123
BLE
114
103
104

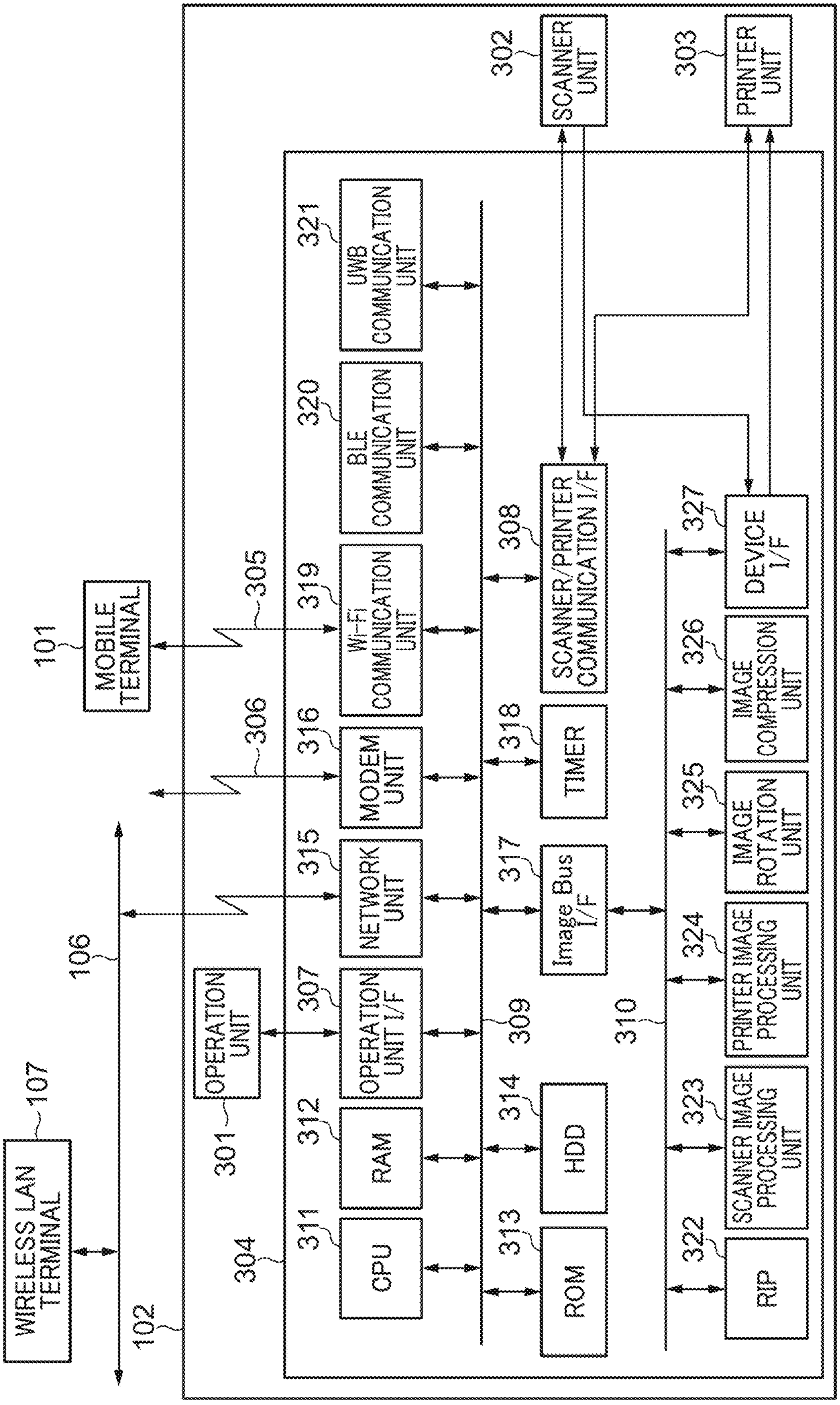

FIG. 3

WIRELESS LAN TERMINAL
107
106
102
304
101
MOBILE TERMINAL
305
306
301
OPERATION UNIT
302
SCANNER UNIT
303
PRINTER UNIT
311
CPU
312
RAM
307
OPERATION UNIT I/F
315
NETWORK UNIT
316
MODEM UNIT
319
Wi-Fi COMMUNICATION UNIT
320
BLE COMMUNICATION UNIT
321
UWB COMMUNICATION UNIT
309
313
ROM
314
HDD
317
Image Bus I/F
318
TIMER
308
SCANNER/PRINTER COMMUNICATION I/F
310
322
RIP
323
SCANNER IMAGE PROCESSING UNIT
324
PRINTER IMAGE PROCESSING UNIT
325
IMAGE ROTATION UNIT
326
IMAGE COMPRESSION UNIT
327
DEVICE I/F

| DEVICE NAME | PANID | PRINTING CAPABILITY | UWB DISTANCE MEASUREMENT RESULT [m] | CALCULATED DISTANCE OF APPARATUS COMPATIBLE WITH ONLY BLE [m] | RSSI OF BLE [dbm] | UWB COMPATIBLE | BLE TRANSMISSION POWER $P_T$ | BLE TRANSMISSION GAIN $G_T$ |
|---|---|---|---|---|---|---|---|---|
| IMAGE FORMING APPARATUS 103 | XXxx : XXxx : XXxx : XXxx | CL/DOUBLE-SIDED | – | | −69.8 | ○ | △ | □ |
| IMAGE FORMING APPARATUS 105 | XXxx : XXxx : XXxx : XXxA | BW/DOUBLE-SIDED | | – | −76.9 | × | ▲ | ■ |
| IMAGE FORMING APPARATUS 104 | XXxx : XXxx : XXxx : XXxB | BW/SINGLE-SIDED | | – | −81 | × | △' | □' |
| IMAGE FORMING APPARATUS 102 | XXxx : XXxx : XXxx : XXxC | CL/SINGLE-SIDED | – | | −85 | ○ | ▲' | ■' |

| DEVICE NAME | PANID | PRINTING CAPABILITY | UWB DISTANCE MEASUREMENT RESULT [m] | CALCULATED DISTANCE OF APPARATUS COMPATIBLE WITH ONLY BLE [m] | RSSI OF BLE [dbm] | UWB COMPATIBLE | BLE TRANSMISSION POWER $P_T$ | BLE TRANSMISSION GAIN $G_T$ |
|---|---|---|---|---|---|---|---|---|
| IMAGE FORMING APPARATUS 103 | XXxx : XXxx : XXxx : XXxx | CL/DOUBLE-SIDED | 1 | | −69.8 | ○ | △ | □ |
| IMAGE FORMING APPARATUS 105 | XXxx : XXxx : XXxx : XXxA | BW/DOUBLE-SIDED | | – | −76.9 | × | ▲ | ■ |
| IMAGE FORMING APPARATUS 104 | XXxx : XXxx : XXxx : XXxB | BW/SINGLE-SIDED | | – | −81 | × | △' | □' |
| IMAGE FORMING APPARATUS 102 | XXxx : XXxx : XXxx : XXxC | CL/SINGLE-SIDED | 7 | | −85 | ○ | ▲' | ■' |

| DEVICE NAME | PANID | PRINTING CAPABILITY | UWB DISTANCE MEASUREMENT RESULT [m] | CALCULATED DISTANCE OF APPARATUS COMPATIBLE WITH ONLY BLE [m] | RSSI OF BLE [dbm] | UWB COMPATIBLE | BLE TRANSMISSION POWER $P_T$ | BLE TRANSMISSION GAIN $G_T$ |
|---|---|---|---|---|---|---|---|---|
| IMAGE FORMING APPARATUS 103 | XXxx : XXxx : XXxx : XXxx | CL/DOUBLE-SIDED | 1 | | −69.8 | ○ | △ | □ |
| IMAGE FORMING APPARATUS 105 | XXxx : XXxx : XXxx : XXxA | BW/DOUBLE-SIDED | | 2.5 | −76.9 | × | ▲ | ■ |
| IMAGE FORMING APPARATUS 104 | XXxx : XXxx : XXxx : XXxB | BW/SINGLE-SIDED | | 4.2 | −81 | × | △' | □' |
| IMAGE FORMING APPARATUS 102 | XXxx : XXxx : XXxx : XXxC | CL/SINGLE-SIDED | 7 | | −85 | ○ | ▲' | ■' |

| LIST NAME | CONSTANT N | ENVIRONMENTAL VARIABLE n |
|---|---|---|
| LIST 1 | -50.0 | 1.8 |

$$P_R[mW] = G_T G_R P_T \left(\frac{\lambda}{4\pi D}\right)^n$$

1002

($P_R$: RECEPTION POWER, $P_T$: TRANSMISSION POWER, $G_T$: TRANSMISSION GAIN, $G_R$: RECEPTION GAIN, n: ENVIRONMENTAL VARIABLE, D: DISTANCE, $\lambda$: WAVELENGTH)

1003

| |
|---|
| n = 2: IDEAL SPACE<br>n < 2: SPACE WHERE RADIO WAVES PROPAGATE WHILE BEING REFLECTED<br>n > 2: SPACE WHERE RADIO WAVES PROPAGATE WHILE BEING ABSORBED AND ATTENUATED |

1004

$$RSSI_{[dbm]} = 10\log_{10}G_T + 10\log_{10}G_R + 10\log_{10}P_T + 10 \times n \times \log_{10}\lambda - 10 \times n \times \log_{10}4\pi D$$

1005

$$N = 10\log_{10}G_T + 10\log_{10}G_R + 10\log_{10}P_T + 10 \times n \times \log_{10}\lambda$$

1006

$$RSSI_{[dbm]} = N - 10 \times n \times \log_{10}4\pi D$$

1007

$$D[m] = 10^{\{(N-RSSI)/(10 \times n)\}}/4\pi$$

FIG. 11

$$\begin{cases} -85.0 = N - 10 \times n \times \log_{10} 4\pi \times 7.0 \\ -69.8 = N - 10 \times n \times \log_{10} 4\pi \times 1.0 \end{cases}$$

1101 … IMAGE FORMING APPARATUS 102

1102 … IMAGE FORMING APPARATUS 103

$$\Leftrightarrow N \fallingdotseq -50.0$$ 1103

$$n = 1.79979\ldots$$

$$\fallingdotseq 1.8$$ 1104

$$D = 10^{[(-50.0-(RSSI))/(10 \times 1.8)]}/4\pi$$

1105 … DISTANCE CALCULATION EQUATION FOR IMAGE FORMING APPARATUS COMPATIBLE WITH ONLY BLE $$D = 10^{[(-50.0-(-76.94))/(10 \times 1.8)]}/4\pi$$

1106 … IMAGE FORMING APPARATUS 105

$$= 2.4984\ldots$$

$$\fallingdotseq 2.5[m]$$ 1107

*FIG. 16*

$$N = RSSI + 10 \times n \times \log_{10} 4\pi D$$ 1601

DATA PROCESSING SYSTEM IN WHICH DISTANCE MEASUREMENT IS PERFORMED, CONTROL METHOD THEREFOR, AND STORAGE MEDIUM

BACKGROUND OF THE INVENTION

Field of the Invention

The present invention relates to a data processing system in which distance measurement is performed, a control method therefor, and a storage medium.

Description of the Related Art

One example of wireless communication includes Bluetooth (registered trademark) which is equipped even on mobile terminals such as smartphones and tablet terminals. Further, Bluetooth includes Bluetooth Low Energy (hereinafter, referred to as "BLE") which is an extended specification of Bluetooth. In the wireless communication using the BLE, it is possible to roughly measure, using received radio wave intensity, a distance between a transmitting device and a receiving device of the BLE radio wave.

In addition, in recent years, there is Ultra Wide Band (hereinafter, referred to as "UWB") as wireless communication which is equipped on mobile terminals and is becoming widespread. Compared to the case where the distance measurement using the wireless communication by BLE may have an error of several meters at the maximum, the wireless communication by UWB can measure the distance with an error in units of centimeters, and thus has an advantage in the accuracy of distance measurement. It should be noted that, in the following description, distance measurement using wireless communication by BLE may be denoted as "BLE distance measurement", and distance measurement using wireless communication by UWB may be denoted as "UWB distance measurement". In addition, wireless communication by BLE may be abbreviated as "BLE communication", and wireless communication by UWB may be abbreviated as "UWB communication".

In the conventional art, there are many cases where a mobile terminal measures a distance using the received radio wave intensity. Therefore, Japanese Laid-Open Patent Publication (kokai) No. 2019-178874 proposes a technique assuming that a reference device for correcting received radio wave intensity of a mobile terminal is used in combination with the mobile terminal. In detail, a user carries the reference device together with the mobile terminal. Then, the mobile terminal transmits, to an image forming apparatus, information indicating the received radio wave intensity for a wireless signal transmitted from the image forming apparatus, as measurement information, whereas the reference device transmits, to the image forming apparatus, information indicating the received radio wave intensity for the wireless signal transmitted from the image forming apparatus, as reference information. The image forming apparatus transmits, to the mobile terminal, the reception sensitivity information calculated based on the received measurement information and the received reference information. The mobile terminal corrects threshold information based on the received reception sensitivity information. Then, the mobile terminal specifies the distance to the image forming apparatus using the corrected threshold information and the received radio wave intensity for the wireless signal transmitted from the image forming apparatus. As a result, the mobile terminal can acquire a distance measurement result with improved accuracy, regardless of performance of the mobile terminal or surrounding environment.

SUMMARY OF THE INVENTION

However, even in a case where the technique of Japanese Laid-Open Patent Publication (kokai) No. 2019-178874 is applied to BLE distance measurement, accuracy is only improved with rough distance measurement in which an error of several meters can occur. Therefore, there is a problem that the accuracy that can be achieved by this technique does not reach the accuracy of UWB distance measurement in which an error only in units of centimeters occurs. Therefore, a more accurate correction technique for BLE distance measurement has been required.

The present invention provides a data processing system, a control method therefor, and a storage medium, capable of improving the accuracy of distance measurement using wireless communication.

Accordingly, the present invention provides a data processing system comprising a first image forming apparatus, a second image forming apparatus, and a mobile terminal, wherein the first image forming apparatus is configured to perform, with the mobile terminal, first wireless communication and second wireless communication for performing distance measurement with accuracy higher than accuracy in the first wireless communication, the second image forming apparatus is configured to perform, with the mobile terminal, the first wireless communication, and not to perform the second wireless communication, and the mobile terminal comprises one or more controllers configured to function as: a distance calculation unit configured to substitute received radio wave intensity of the second image forming apparatus in the first wireless communication between the mobile terminal and the second image forming apparatus, into a distance calculation equation which is based on the received radio wave intensity of the first image forming apparatus in the first wireless communication and on a result of distance measurement by the second wireless communication performed between the mobile terminal and the first image forming apparatus, thereby calculating a distance from the mobile terminal to the second image forming apparatus.

According to the present invention, it is possible to improve the accuracy of distance measurement using wireless communication.

Further features of the present invention will become apparent from the following description of exemplary embodiments with reference to the attached drawings.

BRIEF DESCRIPTION OF THE DRAWINGS

FIG. 3 is a block diagram showing an example of a hardware configuration of an image forming apparatus.

FIGS. 9A to 9D are diagrams showing examples of a first list and a second list stored in a list storage part of a print application of the mobile terminal.

FIG. 10 is a diagram showing a derivation process for a distance calculation equation for an image forming apparatus compatible with only BLE.

FIG. 11 is a diagram showing a derivation process and a calculation result of a distance for the distance calculation equation for the image forming apparatus compatible with only BLE.

FIGS. 12A and 12B are diagrams for describing details of an operation flow, in which FIG. 12A is a flowchart showing an operation in step S712, and FIG. 12B is a flowchart showing an operation in step S713.

FIG. 16 is a diagram showing an equation for obtaining a value of a constant unique to the mobile terminal, in the third embodiment.

DESCRIPTION OF THE EMBODIMENTS

Figure 1:
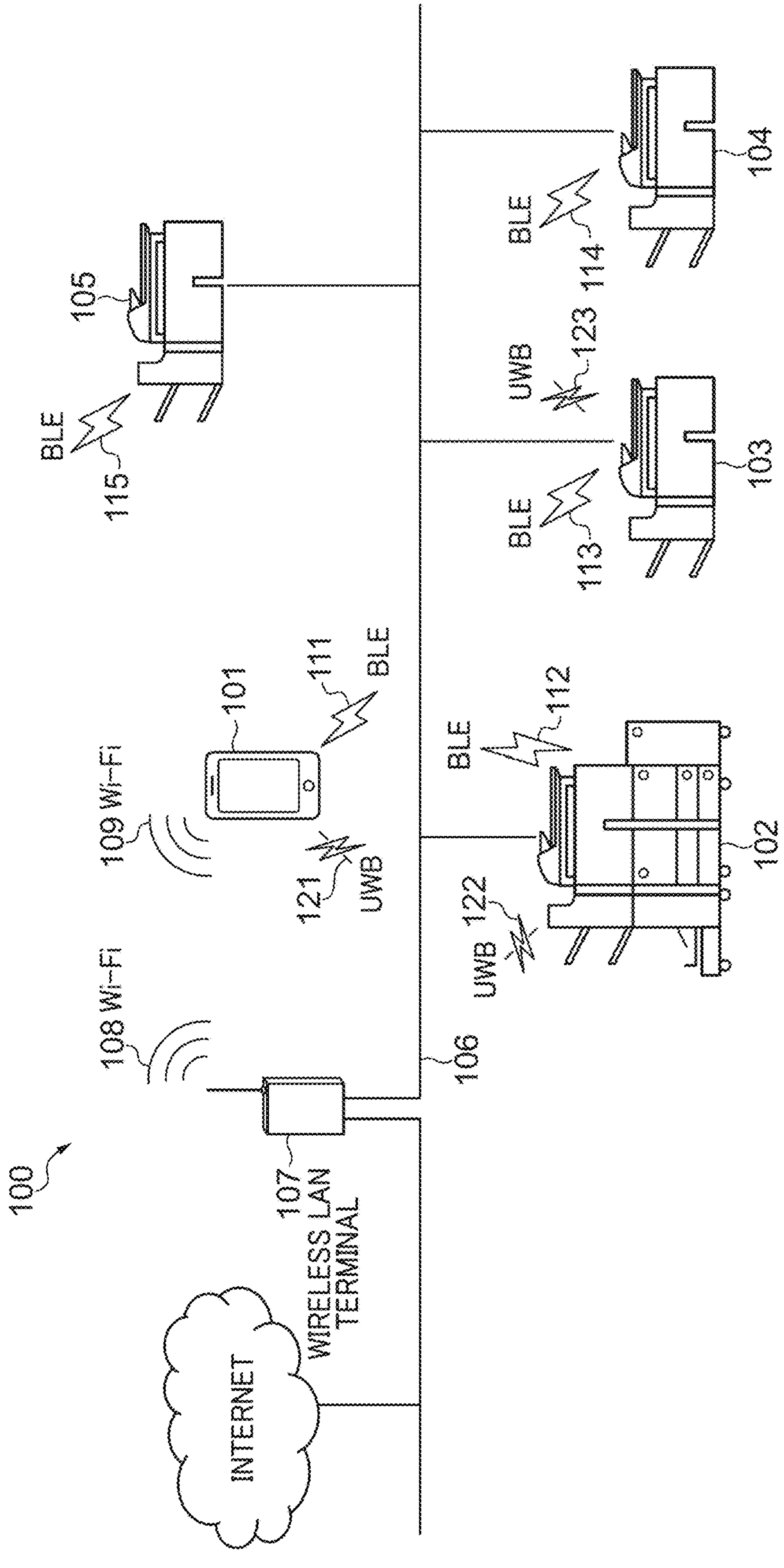
FIG. 1 is a diagram showing an example of a configuration of a data processing system according to a first embodiment.

The present invention will now be described in detail below with reference to the accompanying drawings showing embodiments thereof.

However, the configurations described in the following embodiments are merely examples, and the scope of the present invention is not limited by the configurations described in the embodiments. For example, each part constituting the present invention can be replaced with a unit having any configuration capable of exhibiting similar functions. In addition, any component may be added. Any two or more configurations (features) of the embodiments can be combined. It should be noted that, in the drawings, the same/similar or corresponding constituting members, devices, components, and processes are denoted by the same reference numerals.

FIG. 1 is a diagram showing an example of a configuration of a data processing system 100 according to the first embodiment. The data processing system 100 includes one mobile terminal 101 and four image forming apparatuses 102, 103, 104, and 105. The mobile terminal 101 is configured to transmit a print job to any of the four image forming apparatuses 102 to 105. The mobile terminal 101 is, for example, a smartphone or a tablet terminal. It should be noted that the mobile terminal 101 may be a laptop personal computer, a digital camera with a communication function, or the like. Each of the image forming apparatuses 102 to 105 is a peripheral device having a printer function, a copy function, a scanner function, a facsimile transmission function, and the like. That is, each of the image forming apparatuses 102 to 105 is a multifunction peripheral (MFP) having a plurality of functions. It should be noted that each of the image forming apparatuses 102 to 105 may be a printing apparatus or the like having at least a printer function.

Each of the image forming apparatuses 102 to 105 is connected to a wired LAN 106. Therefore, the image forming apparatuses 102 to 105 can exchange information by mutual communication via the wired LAN 106. The wired LAN 106 is connected to a wireless LAN terminal 107. The wireless LAN terminal 107 is a master unit of a wireless LAN having a general network and router function, and provides a wireless LAN through Wi-Fi in a home, an office, or the like. Further, the wireless LAN terminal 107 is connected to the Internet via an optical network unit (ONU) or a modem (not illustrated).

By enabling the Wi-Fi function of the mobile terminal 101, the mobile terminal 101 can participate in the wireless LAN network provided by the wireless LAN terminal 107. In addition, the mobile terminal 101 can participate in the network of the wired LAN 106 via the wireless LAN terminal 107. It should be noted that reference numeral 108 denotes a Wi-Fi radio wave transmitted and received by the wireless LAN terminal 107. Reference numeral 109 denotes a Wi-Fi radio wave transmitted and received by the mobile terminal 101. When entering the area of the wireless LAN where Wi-Fi radio wave 108 from the wireless LAN terminal 107 reaches, the mobile terminal 101 can automatically participate in the network of the wireless LAN and/or the network of wired LAN 106 by using preset authentication information. As a result, the mobile terminal 101 can exchange information with each of the image forming apparatuses 102 to 105 by mutual communication via the wireless LAN communication provided by the wired LAN 106 and the wireless LAN terminal 107.

Reference numeral 111 denotes a BLE radio wave transmitted and received by the mobile terminal 101. Reference numerals 112, 113, 114, and 115 denote BLE radio waves transmitted and received by respective image forming apparatuses 102 to 105. The BLE radio waves 111 to 115 form a wireless personal area network (WPAN) between terminals and devices that the BLE radio waves reach (terminals and devices that exchange the BLE radio waves 111 to 115). Reference numeral 121 denotes a UWB radio wave transmitted and received by the mobile terminal 101. Reference numerals 122 and 123 denote UWB radio waves transmitted and received by respective image forming apparatuses 102 and 103. The UWB radio waves 121 to 123 form a WPAN between terminals and devices which the UWB radio waves reach (terminals and devices that exchange the UWB radio waves 121 to 123).

It should be noted that in the present embodiment, each of the image forming apparatuses 104 and 105 is an apparatus not equipped with the UWB communication function (an apparatus not equipped with UWB). Each of the image forming apparatuses 102 to 105 transmits advertisement packets at regular intervals in the BLE communication in the data processing system 100. Then, when receiving a pairing request from application software of the mobile terminal 101, each of image forming apparatuses 102 to 105 performs generic attribute profile (GATT) communication.

Figure 2:
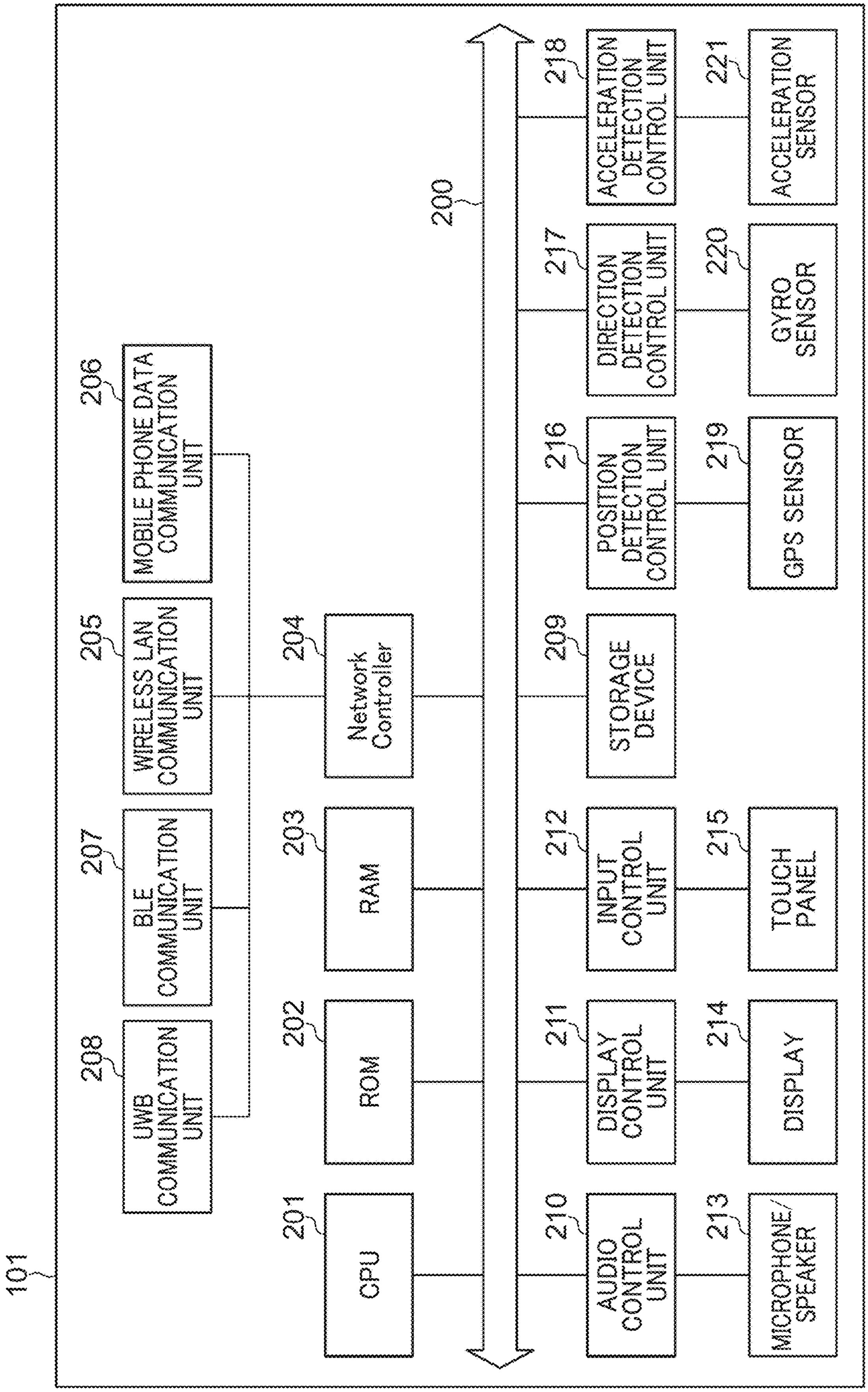
FIG. 2 is a block diagram showing an example of a hardware configuration of a mobile terminal.

FIG. 2 is a block diagram showing an example of a hardware configuration of the mobile terminal 101. In the mobile terminal 101, each component of hardware is connected to a system bus 200. The mobile terminal 101 includes a CPU 201, a ROM 202, a RAM 203, a network controller 204, a wireless LAN communication unit 205, a mobile phone data communication unit 206, a BLE communication unit 207, and a UWB communication unit 208. The CPU 201 is a control unit that integrally controls the mobile terminal 101.

The ROM 202 is a memory in which system software such as an operating system and various application software are stored. It should be noted that, in the following description, the system software and the application software may be abbreviated as "software". The application software may also be abbreviated as "application". The system software and the application software are executed by the CPU 201. Examples of the application software include a call application for controlling a call and a data communication application for controlling data communication. Examples of the data communication application include a print application, mail software, and a web browser. The RAM 203 is a work memory to be used when the CPU 201 executes a program of system software and/or a program of application software. Furthermore, the RAM 203 is also a memory for temporarily storing data and the like when the CPU 201 executes the program.

The wireless LAN communication unit 205, the mobile phone data communication unit 206, the BLE communication unit 207, and the UWB communication unit 208 are connected to the network controller 204. The network controller 204 performs communication control by the wireless LAN communication unit 205 when the mobile terminal 101 participates in the wireless LAN network provided by the wireless LAN terminal 107. The network controller 204 performs communication control by the wireless LAN communication unit 205 also when the mobile terminal 101 participates in the network of the wired LAN 106 via the wireless LAN terminal 107.

The network controller 204 performs communication control by the mobile phone data communication unit 206 when the mobile terminal 101 participates in the wireless communication network provided by the mobile carrier. The network controller 204 performs communication control by the BLE communication unit 207 when forming a WPAN that performs data communication, between terminals and devices which BLE radio waves reach (terminals and devices that exchange BLE radio waves). The network controller 204 performs communication control by the UWB communication unit 208 when forming a WPAN that performs data communication such as distance measurement, between terminals and devices which UWB radio waves reach (terminals and devices that exchange UWB radio waves).

It should be noted that in general, in a case where the mobile terminal 101 can participate in a wireless LAN network, the network controller 204 gives priority to connection to the said wireless LAN. However, in this case, when the mobile terminal 101 is out of the area of the wireless LAN, the network controller 204 performs exclusion control so that the mobile terminal 101 participates in the wireless communication network provided by the mobile carrier. In addition, the network controller 204 controls the wireless communication using BLE/UWB independently of the wireless LAN network and the wireless communication network provided by the mobile carrier in order to achieve the purpose of the wireless communication using BLE/UWB. The mobile terminal 101 includes a storage device 209. The storage device 209 is a nonvolatile storage device. The storage device 209 stores various operation mode settings, operation logs, and the like which need to be held by the mobile terminal 101 even after the mobile terminal 101 is restarted.

The mobile terminal 101 includes an audio control unit 210, a display control unit 211, an input control unit 212, a microphone/speaker 213, a display 214, and a touch panel 215. The microphone/speaker 213 is connected to the audio control unit 210. The audio control unit 210 is used, for example, when a call application is activated and the user is making a call. At that time, the audio control unit 210 inputs and outputs audio data with the microphone/speaker 213 and makes mediation for the audio data and the audio data control program. The display 214 is connected to the display control unit 211. The display control unit 211 controls information to be displayed on the display 214.

The touch panel 215 is connected to the input control unit 212. The input control unit 212 controls information instructed by the user through a button on the touch panel 215 and/or the mobile terminal 101. The touch panel 215 is integrated with the display 214 by being provided to overlap the display 214. As a result, the touch panel 215 can detect a touch operation such as a tap performed by the user on a screen (described later) displayed on the display 214. The application activated on the mobile terminal 101 provides the user with network communication information, various information about the mobile terminal 101, and the like by using the audio control unit 210, the display control unit 211, and the input control unit 212.

The mobile terminal 101 includes a position detection control unit 216, a direction detection control unit 217, an acceleration detection control unit 218, a GPS sensor 219, a gyro sensor 220, and an acceleration sensor 221. The GPS sensor 219 is connected to the position detection control unit 216. The position detection control unit 216 acquires position information of the mobile terminal 101 from the GPS sensor 219 and provides the acquired position information to the operating system. The gyro sensor 220 is connected to the direction detection control unit 217. The direction detection control unit 217 acquires direction information of the mobile terminal 101 from the gyro sensor 220 and provides the acquired direction information to the operating system. The acceleration sensor 221 is connected to the acceleration detection control unit 218. The acceleration detection control unit 218 acquires acceleration information of the mobile terminal 101 from the acceleration sensor 221 and provides the acquired acceleration information to the operating system. The position detection control unit 216, the direction detection control unit 217, and the acceleration detection control unit 218 are controlled by an operating system operated by the CPU 201.

In the present embodiment, the mobile terminal 101 can perform data communication for measuring each of distances to the image forming apparatuses 102 and 103 via the UWB communication unit 208. The UWB communication unit 208 is compatible with at least TWR (Two Way Ranging) shown in FIG. 5 to be described later as a method of data communication of such distance measurement. The mobile terminal 101 measures a distance to the image forming apparatus 102 and a distance to the image forming apparatus 103, via the UWB communication unit 208 by TWR. In this case, specifically, the mobile terminal 101 transmits a distance measurement request packet for the TWR via the UWB communication unit 208, and receives a distance measurement response packet from each of the image forming apparatuses 102 and 103 corresponding to the distance measurement request packet. Further, in the mobile terminal 101, the CPU 201 performs data processing on the data included in the received distance measurement response packet to calculate the distance, thereby generating the distance information, and provides the distance information to the application according to the timing at which the application is requested. These matters are similarly applied to a case where, in the data processing system 100, the mobile terminal 101 measures, by TWR, a distance to a peripheral device, which is a peripheral device other than the image forming apparatuses 102 and 103 and can perform wireless communication by UWB.

In this way, in the data processing system 100, the mobile terminal 101 can provide distance information indicating a distance between the mobile terminal 101 and each of the image forming apparatuses 102 and 103 and distance information indicating a distance between the mobile terminal 101 and the peripheral device capable of performing wireless communication by UWB. Furthermore, in the data processing system 100, the mobile terminal 101 can cope with each case where distance measurement is requested from a peripheral device capable of performing wireless communication by UWB including the image forming apparatuses 102 and 103. In such case where a distance measurement request is received, upon receiving a distance measurement request packet of TWR from the image forming apparatus 102, 103, or the like, the mobile terminal 101 transmits a distance measurement response packet corresponding to the received distance measurement request packet.

It should be noted that in the present embodiment, the mobile terminal 101 may be a device that does not include the mobile phone data communication unit 206, the audio control unit 210, the microphone/speaker 213 or the like. Furthermore, the mobile terminal 101 may be a device that does not include the position detection control unit 216, the direction detection control unit 217, the acceleration detection control unit 218, the GPS sensor 219, the gyro sensor 220, the acceleration sensor 221, or the like.

Next, a hardware configuration of each of the image forming apparatuses 102 to 105 will be described. FIG. 3 is a block diagram showing an example of a hardware configuration of the image forming apparatus 102. The image forming apparatus 102 includes an operation unit 301, a scanner unit 302, a printer unit 303, and a controller 304. The operation unit 301 is used by a user who uses the image forming apparatus 102 to perform various operations, and is configured of, for example, a liquid crystal display (LCD) having a touch panel function. The scanner unit 302 includes, although they are not illustrated, a CPU that controls the scanner unit 302, an illumination lamp and a scanning mirror for reading a document, and the like. The scanner unit 302 reads an image (image information) in accordance with an instruction from the operation unit 301. The printer unit 303 includes, although they are not illustrated, a CPU that controls the printer unit 303, a photosensitive drum for forming an image, a fixing device for fixing, and the like. The printer unit 303 prints an image based on image data on a sheet in accordance with an instruction from the operation unit 301.

The controller 304 integrally controls communication with an external device such as the mobile terminal 101 connected to the image forming apparatus 102 via the wired LAN 106, a wireless LAN 305, and/or a public line 306. It should be noted that the wireless LAN 305 is provided via Wi-Fi, by the wireless LAN terminal 107 connected to the wired LAN 106. The controller 304 includes an operation unit I/F 307 connected to the operation unit 301, and a scanner/printer communication I/F 308 connected to the scanner unit 302 and the printer unit 303. The controller 304 further includes a system bus 309 and an image bus 310. It should be noted that "I/F" described in each embodiment stands for an interface.

In addition to the operation unit I/F 307 and the scanner/printer communication I/F 308 described above, a CPU 311, a RAM 312, a ROM 313, a hard disk drive (HDD) 314, a network unit 315, a modem unit 316, an Image Bus I/F 317, a timer 318, a Wi-Fi communication unit 319, a BLE communication unit 320, and a UWB communication unit 321 are connected to the system bus 309. The operation unit I/F 307 has a role of transmitting, to the CPU 311, information input by the user who uses the image forming apparatus 102 through the operation unit 301. Meanwhile, the CPU 311 outputs image data to be displayed on the LCD of the operation unit 301, to the operation unit 301 via the operation unit I/F 307.

The scanner/printer communication I/F 308 communicates with each of the scanner unit 302 and the printer unit 303. The CPU 311 is a control unit that integrally controls the image forming apparatus 102. The RAM 312 is a system work memory for the CPU 311 to operate, and is an image memory for temporarily storing image data. A boot program to be executed by the CPU 311 and the like are stored in the ROM 313, in advance. The HDD 314 stores system software, various application software, image data, a counter value, and the like. The network unit 315 is connected to the wired LAN 106, and performs data communication between the image forming apparatus 102 and each of the image forming apparatuses 103 to 105 on the wired LAN 106, and data communication between the image forming apparatus 102 and another device (not illustrated) on the wired LAN 106.

The modem unit 316 is connected to the public line 306 and performs data communication between the image forming apparatus 102 and a facsimile machine (not illustrated) or the like which is an external device. The image bus I/F 317 functions as a bus bridge for converting a data structure between the system bus 309 and the image bus 310. The timer 318 tracks time and hours. The Wi-Fi communication unit 319 performs wireless communication by Wi-Fi, between the image forming apparatus 102 and the mobile terminal 101 or the like, in the wireless LAN 305. The BLE communication unit 320 performs wireless communication using BLE between the image forming apparatus 102 and the mobile terminal 101 or the like. The UWB communication unit 321 performs wireless communication using UWB between the image forming apparatus 102 and each of the mobile terminal 101, the image forming apparatus 103, and the like.

In addition to the above-described image bus I/F 317, a raster image processor (RIP) 322, a scanner image processing unit 323, a printer image processing unit 324, an image rotation unit 325, an image compression unit 326, and a device I/F 327 are connected to the image bus 310. On the image bus 310, image data is transferred at a high speed between the components connected to the image bus 310. The RIP 322 expands a Page Description Language (PDL) code included in the print job into a bitmap image. It should be noted that the print job is transmitted from the mobile terminal 101 to the image forming apparatus 102 via wireless communication by Wi-Fi, for example.

The scanner image processing unit 323 performs correction, processing, editing, and the like on the image data input from the scanner unit 302. The printer image processing unit 324 performs correction, resolution conversion, and the like on the image data to be output (printed) by the printer unit 303. The image rotation unit 325 rotates image data to be printed by the printer unit 303. The image compression unit 326 performs a compression/expansion process in JPEG on multi-valued image data, and performs a compression/expansion process in JBIG, MMR, or MH on binary image data. The device I/F 327 connects each of the scanner unit 302 and the printer unit 303 to the controller 304 to perform synchronous or asynchronous conversion of image data.

In the controller 304, the CPU 311 stores and manages, as job log information, a history of execution of a print job, a history of execution of a copy job, and the like in the RAM 312 or the HDD 314. Each of the history of execution of a print job, history of execution of a copy job, and the like includes, for example, a user name, the number of copies, color printing, output attribute information, and the like. It should be noted that the hardware configuration of the image forming apparatus 103 is similar to the hardware configuration of the image forming apparatus 102. Furthermore, the hardware configuration of each of the image forming apparatuses 104 and 105 is similar to the hardware configuration of the image forming apparatus 102 except for the UWB communication unit 321. Therefore, a detailed description of the hardware configuration of each of the image forming apparatuses 103, 104, and 105 will be omitted.

Figure 4:
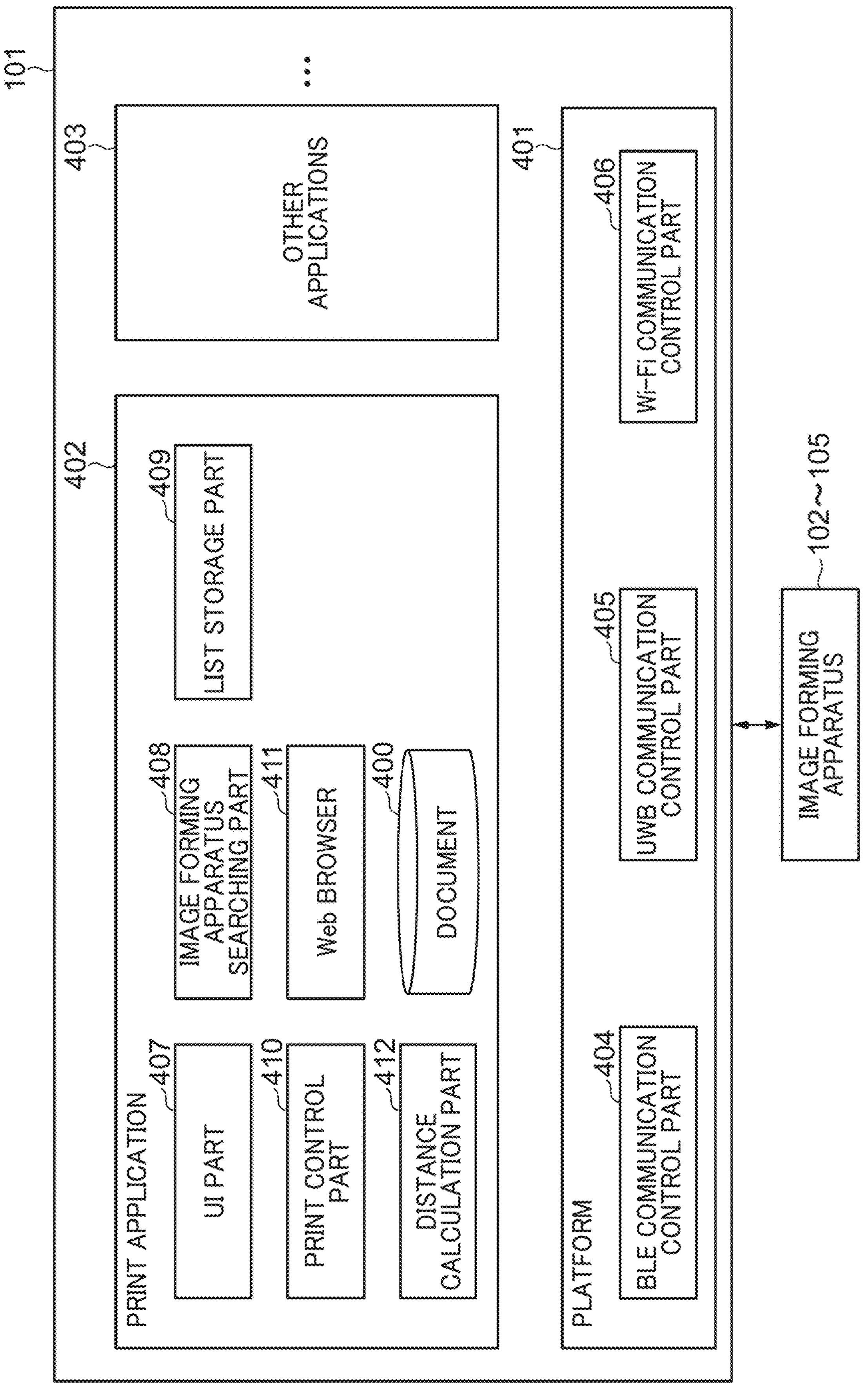
FIG. 4 is a block diagram showing an example of a software configuration of the mobile terminal.

FIG. 4 is a block diagram showing an example of a software configuration of the mobile terminal 101. FIG. 4 shows a configuration of software of the mobile terminal 101 and a data area managed by the software. A document 400 is a data area stored and managed in the RAM 203 by the software. As shown in FIG. 4, the software of the mobile terminal 101 includes a platform 401, a print application 402, other applications 403, and the like.

The platform 401 can be configured by, for example, a platform such as Android (registered trademark) of Google, iOS (registered trademark) of Apple, or the like. The platform 401 has a device driver group for controlling various types of hardware, and provides an application programming interface (API) for using the hardware to an application operating on the platform 401. The platform 401 includes a BLE communication control part 404, a UWB communication control part 405, and a Wi-Fi communication control part 406 as device drivers.

The print application 402 is installed in the ROM 202 as an application that operates on the operating system. The print application 402 is configured of a UI part 407 (display unit) (change unit), an image forming apparatus searching part 408, a list storage part 409, a print control part 410, a web browser 411, and a distance calculation part 412. The UI part 407 provides a user with a user interface (UI) for allowing the user to set a unique function of the print application 402, via the display 214 of the mobile terminal 101.

The image forming apparatus searching part 408 searches for a device by a multicast domain name system (mDNS), in the network of the wired LAN 106 and the network of the wireless LAN 305 in which the mobile terminal 101 participates. The device to be searched for is a network device capable of wireless communication by the BLE communication control part 404, the UWB communication control part 405, the Wi-Fi communication control part 406, and/or the like. In addition, the image forming apparatus searching part 408 acquires detailed information about each of the image forming apparatuses 102 to 105 that the mobile terminal 101 can instruct to print (that is, the image forming apparatuses 102 to 105 supported by the print application 402) among the network devices that have responded to the mDNS search. The acquisition of the detailed information is performed by IPP (Internet Printing Protocol)/IPPS (IPP over SSL/TLS). It should be noted that the communication method used for the above-described search and acquisition is not limited to mDNS or IPP/IPPS.

In addition, the image forming apparatus searching part 408 provides a function of searching for the image forming apparatuses 102 to 105 that the mobile terminal 101 can instruct to print, in a WPAN capable of performing data communication using BLE or a WPAN capable of performing data communication using UWB. Furthermore, the image forming apparatus searching part 408 performs communication control for measuring each distance to the image forming apparatuses 102 and 103, via the UWB communication control part 405. As a result, the image forming apparatus searching part 408 provides a function of acquiring distance information.

Figure 7:
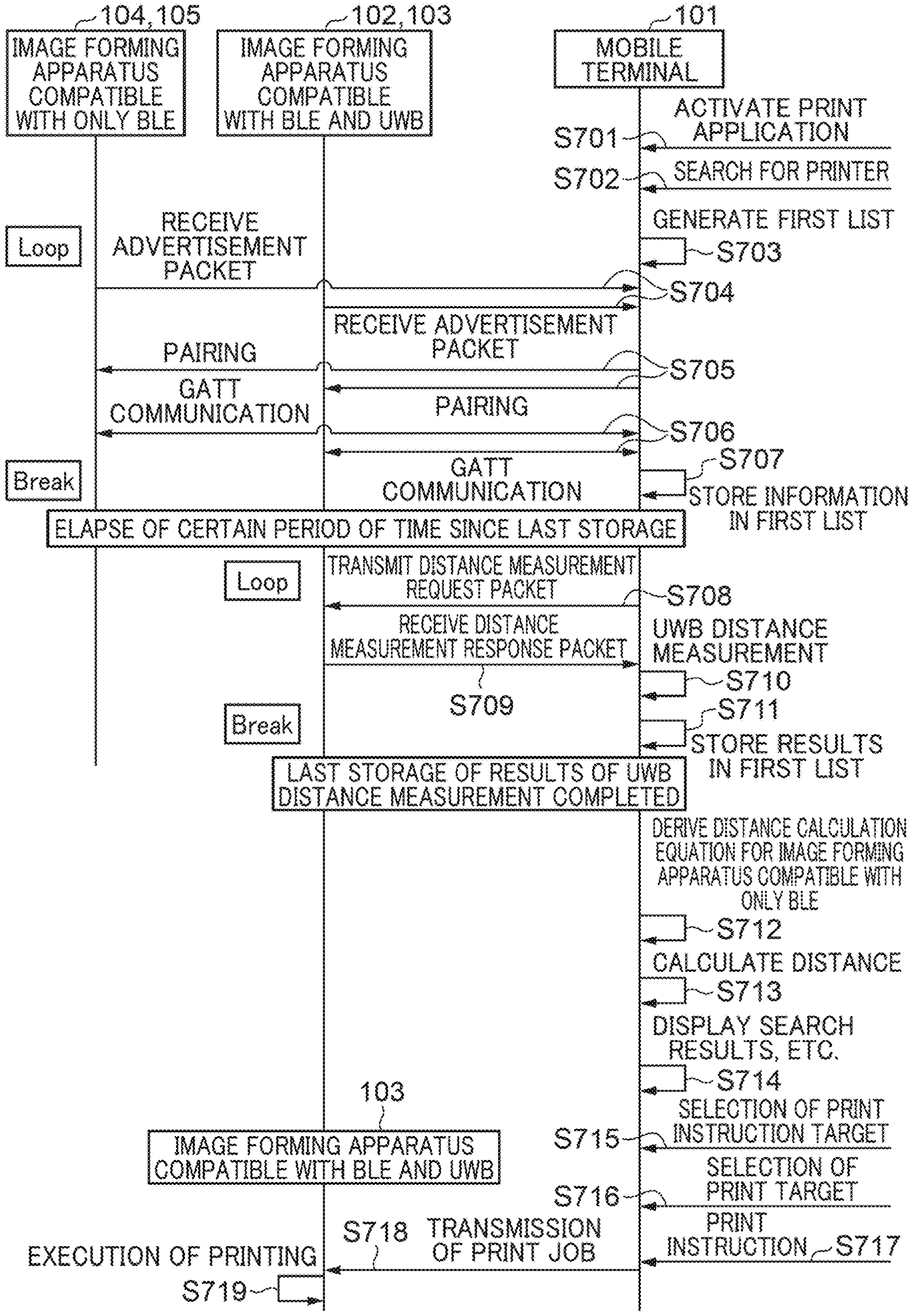
FIG. 7 is a sequence diagram showing an operation process of mobile printing in the first embodiment.

The list storage part 409 is secured in the RAM 203, and stores a first list, a second list, and the like to be described later. The print control part 410 provides a function of generating a print job to be transmitted to the image forming apparatuses 102 to 105 capable of wireless communication with the mobile terminal 101 and of transmitting the generated print job to the image forming apparatuses 102 to 105. It should be noted that the print application 402 may have not only a print instruction function but also a scan instruction function. The web browser 411 provides a function of browsing a web page, and the like. Using the result of distance measurement performed by the image forming apparatus searching part 408 via the UWB communication control part 405, the distance calculation part 412 performs calculation processing for calculating, with accuracy higher than the accuracy of BLE distance measurement, each distance to the image forming apparatuses 104 and 105 not equipped with the UWB communication function. It should be noted that the detailed description of the calculation processing will be made later when step S712 and step S713 in FIG. 7, FIGS. 10 and 11 are described.

Figure 5:
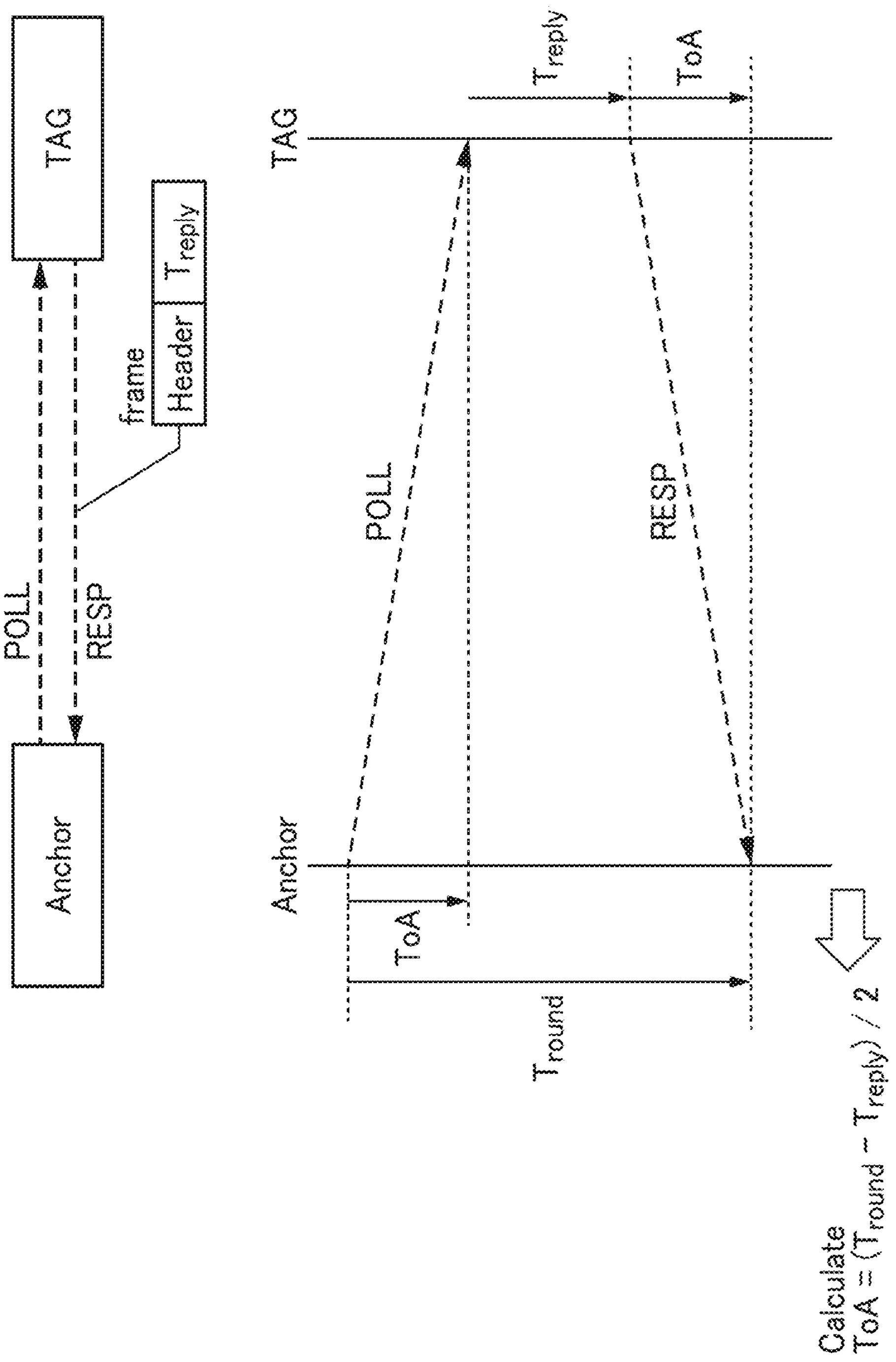
FIG. 5 is a sequence diagram showing processing when distance measurement is performed by wireless communication using UWB.

FIG. 5 is a sequence diagram showing processing when distance measurement is performed by wireless communication using UWB. FIG. 5 shows a method of distance measurement performed between the mobile terminal 101 and each of the image forming apparatuses 102 and 103 in the data processing system 100, which shows a procedure of distance measurement between "Anchor" and "TAG" defined by the IEEE 802.15.4 group. The method is a method of calculating a time (Time Of Arrival (ToA)) at which a frame arrives between Anchor and TAG, and measuring a distance between Anchor and TAG by using the calculated ToA and a propagation speed (that is, a light speed) of a radio wave.

Furthermore, FIG. 5 shows a procedure of distance measurement by TWR that transmits a frame bidirectionally between Anchor and TAG. In the TWR, the Anchor is a main component of distance measurement, and the TAG is a target of distance measurement. The Anchor issues a POLL frame to a TAG when measuring a distance to the TAG. When the TAG that has received the POLL frame recognizes that the received POLL frame is addressed to the TAG itself, the TAG transmits the RESP frame to the Anchor when a predetermined time ($T_{reply}$ value) has elapsed from the moment of reception of the POLL frame. A $T_{reply}$ value is assigned to the RESP frame.

When receiving the RESP frame, the Anchor calculates ToA which is the time required for the POLL frame to arrive and is the time required for the RESP frame to arrive. In the calculation of the ToA, as shown in FIG. 5, the time ($T_{round}$) from the issuance of the POLL frame to the reception of the RESP frame and the $T_{reply}$ value included in the RESP frame are used. Furthermore, the Anchor calculates the distance from the Anchor to the TAG using the ToA obtained by the calculation and the propagation speed (light speed) of the radio wave.

In the data processing system 100, any of the mobile terminal 101 and the image forming apparatuses 102 and 103 can play any role of the TAG and the Anchor in the above-described distance measuring method of the TWR. Therefore, between the mobile terminal 101 and the image forming apparatus 102, 103, transmission and reception of frames via the UWB communication units 208 and 321 and calculation are performed in response to a request from each application, whereby the distance to the distance measurement target can be measured. In addition, the above-described method of measuring the distance of TWR is used in step S710 of FIG. 7 described later. It should be noted that the POLL frame includes the distance measurement request packet described in the description of FIG. 2. In addition, the RESP frame includes the distance measurement response packet described in the description of FIG. 2.

Figure 6:
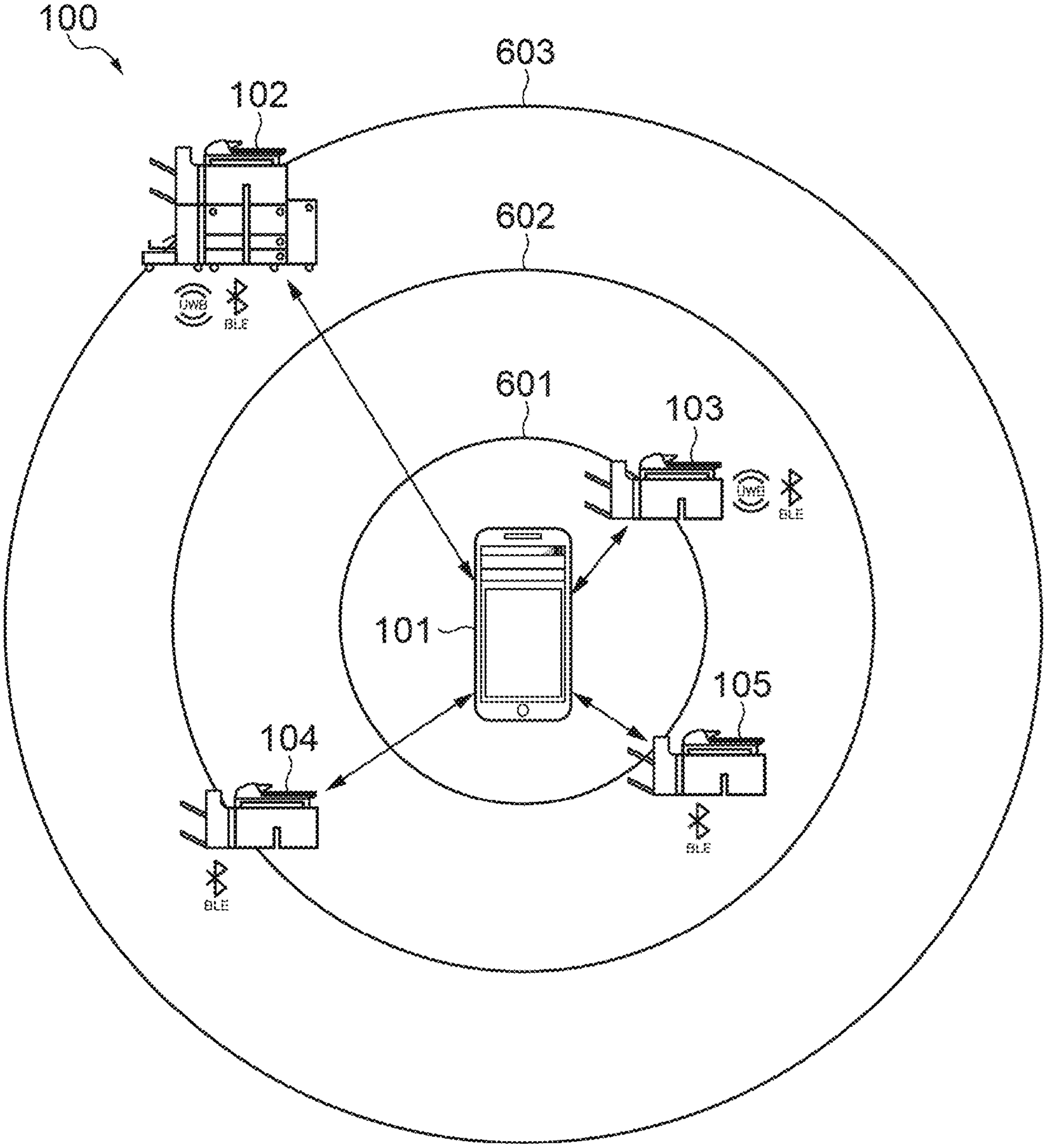
FIG. 6 is a schematic diagram showing a rough positional relationship between a mobile terminal and image forming apparatus in the data processing system according to the first embodiment.

FIG. 6 is a schematic diagram showing a rough positional relationship between the mobile terminal 101 and image forming apparatuses 102 to 105 in the data processing system 100 according to the first embodiment. In the data processing system 100 according to the first embodiment, the image forming apparatuses 102 to 105 are present around the mobile terminal 101 held by the user. Each of the mobile terminal 101 and the image forming apparatuses 102 and 103 (first image forming apparatuses) is capable of performing BLE communication and UWB communication. Meanwhile, the image forming apparatuses 104 and 105 (second image forming apparatuses) are capable of performing only BLE communication.

It should be noted that in the following description, the capability of both of BLE communication (first wireless communication) and UWB communication (second wireless communication) may be referred to as "compatible with BLE and UWB", and the capability of only BLE communication may be referred to as "compatible with only BLE". FIG. 6 shows an area 601 within 1 m, an area 602 within 1 to 5 m, and an area 603 within 5 to 10 m as a guide of the distance from the mobile terminal 101. Hereinafter, a case where the image forming apparatuses 102 to 105 transmit advertisement packets of BLE communication at regular intervals will be described.

Hereinafter, a characteristic operation of the first embodiment will be described with reference to FIGS. 7 to 11. FIG. 7 is a sequence diagram showing an operation process of mobile printing (a control method for the data processing system) in the first embodiment. Specifically, this operation process is a process performed by the mobile terminal 101 compatible with BLE and UWB with the image forming apparatus 102, 103 compatible with BLE and UWB and with the image forming apparatus 104, 105 compatible with only BLE. The operation process shown in the sequence diagram of FIG. 7 is implemented by each component of hardware and each component of software constituting each of the mobile terminal 101 and the image forming apparatuses 102 to 105.

In the mobile terminal 101, each component of the software of the mobile terminal 101 is implemented by the CPU 201 (computer) reading a program stored in the ROM 202 into the RAM 203 and executing the program. In each of the image forming apparatuses 102 to 105, each component of software of each of the image forming apparatuses 102 to 105 is implemented by the CPU 311 (computer) reading a program stored in the HDD 314 into the RAM 312 and executing the program. It should be noted that the matters described above are similar in each of the sequence diagrams of FIGS. 14 and 17 described later.

FIG. 7 shows an operation process which is performed by the mobile terminal 101 and each of image forming apparatuses 102 to 105 cooperating and working together via mutual communication, until the printing operation of the image forming apparatus 103 that has received the print job is completed. Therefore, in the operation process, when the user who operates the mobile terminal 101 starts the print application 402 on the mobile terminal 101 and then the image forming apparatus 103 is found and then selected by the user, the print job is transmitted to the image forming apparatus 103. As shown in FIG. 7, in step S701, the CPU 201 of the mobile terminal 101 activates the print application 402 in accordance with a user operation.

Figure 8A:
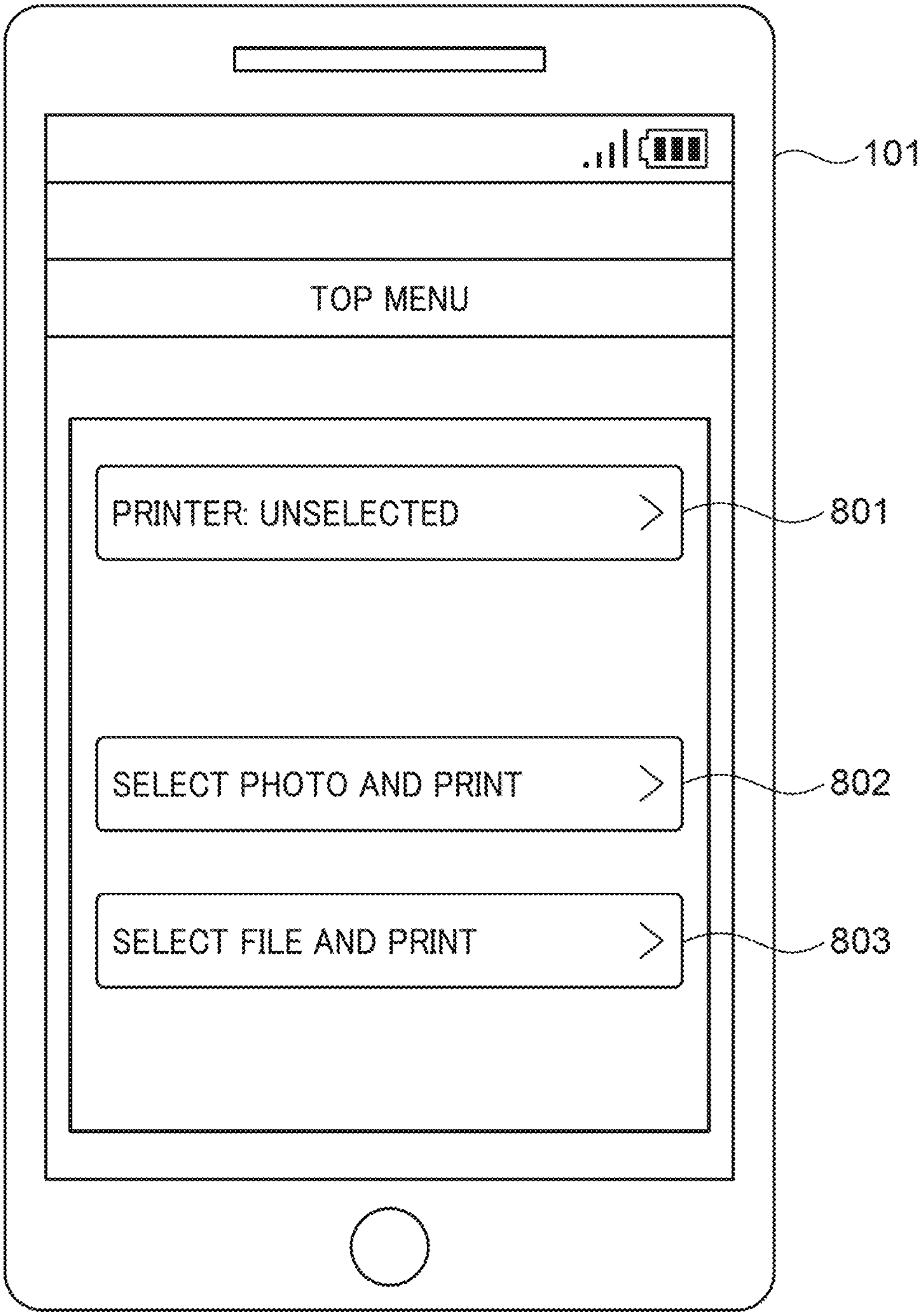
FIGS. 8A to 8F are diagrams showing examples of a user interface (UI) screen provided on a display of the mobile terminal.

FIGS. 8A to 8F are diagrams showing examples of a UI screen provided on the display 214 of the mobile terminal 101. In the mobile terminal 101, when the print application 402 is activated, the display screen of the display 214 transitions to the top menu screen in FIG. 8A. In the top menu screen in FIG. 8A, a button 801 is a button for causing the display screen of the display 214 to transition to a UI screen through which the user selects an image forming apparatus as a print instruction target (that is, transition to a search screen in FIG. 8B to be described later). It should be noted that in a situation where the image forming apparatus is not selected, the button 801 indicates that the image forming apparatus is not selected as shown in FIG. 8A.

When a button 802 is operated (tapped), the display screen of the display 214 transitions to a UI screen to be used to cause the image forming apparatus to perform "printing of a picture selected by the user from among pictures stored in the mobile terminal 101". When the button 803 is operated (tapped), the display screen of the display 214 transitions to a UI screen to be used to cause the image forming apparatus to perform "printing of a file selected by the user from among files such as PDF files and the like stored in the mobile terminal 101". It should be noted that, in a case where an image forming apparatus is not selected, the touch operation is invalidated even if the user performs a touch operation of tapping the button 802, 803.

Figure 8B:
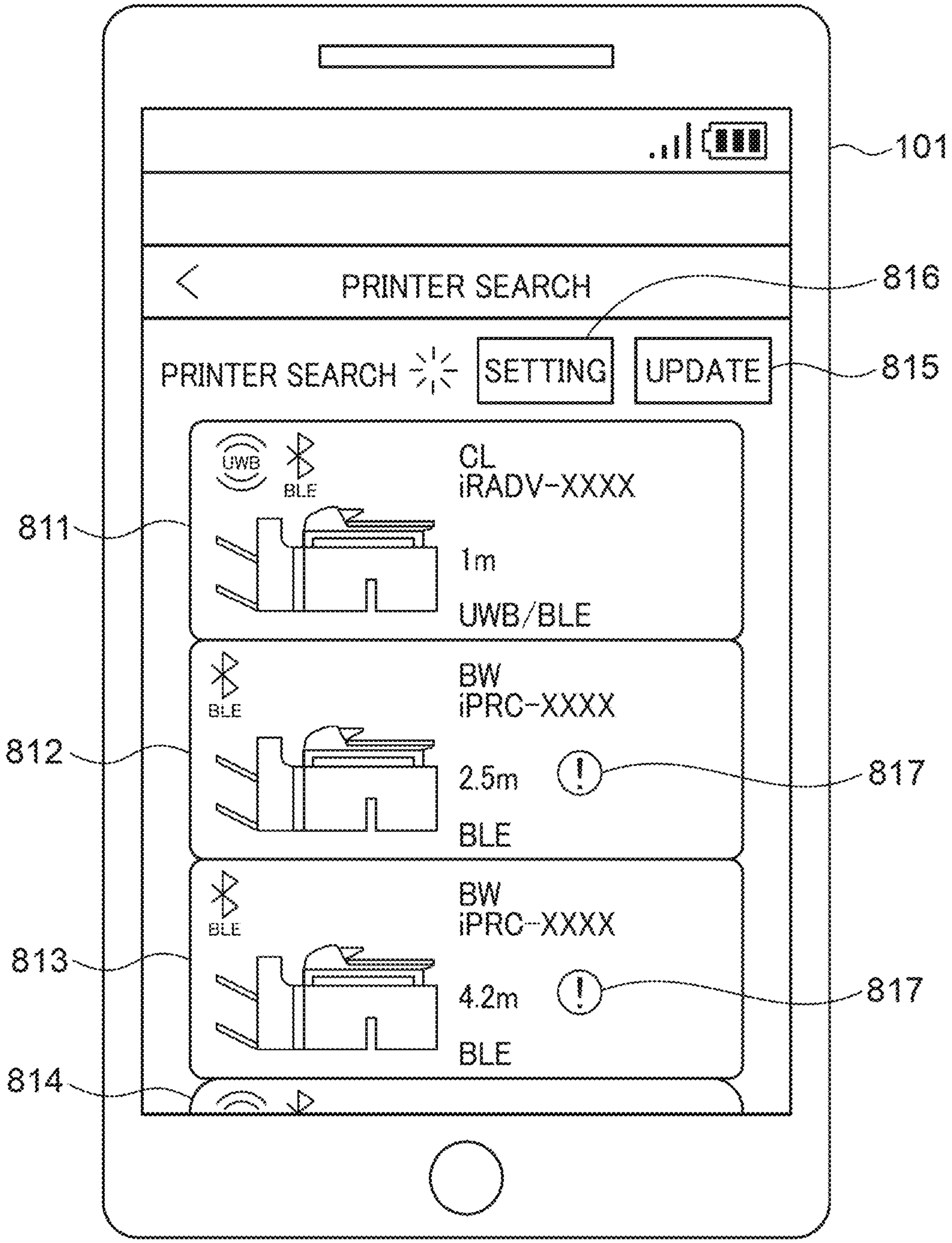

FIG. 7 is referred to again. In step S702, the CPU 201 of the mobile terminal 101 searches for a printer in response to the tap of the button 801. It is assumed that, in the printer search, the image forming apparatuses 102 to 105 are found by communication to be described later. Further, the display screen of the display 214 transitions to the search screen in FIG. 8B. It should be noted that the search screen in FIG. 8B is a screen that can be provided when the processing in step S715 described later is performed. On the search screen of FIG. 8B, the results of the printer search (hereinafter, referred to as an "search results of image forming apparatuses") is displayed, wherein the respective distances from the mobile terminal 101 to the image forming apparatuses 102 to 105 are displayed on the buttons 811, 812, 813, and 814.

When such display is made, the CPU 201 of the mobile terminal 101 accepts a touch operation, by which the user selects an image forming apparatus to be a print instruction target from among search results of image forming apparatuses, via respective buttons 811 to 814 on the search screen of FIG. 8B. It should be noted that a detailed description of the respective buttons 811 to 814 will be given later. In the search screen of FIG. 8B, an update button 815 is a button for updating and displaying the search results, and the like of the image forming apparatuses displayed on the respective buttons 811 to 814. Therefore, when the update button 815 is tapped on the search screen of FIG. 8B, the search results of the image forming apparatuses and the like are updated and displayed on the respective buttons 811 to 814 and the like. At that time, the CPU 201 of the mobile terminal 101 updates and displays the search results of the image forming apparatuses on the respective buttons 811 to 814 or the like based on the detailed information reacquired by the search through the communication described later, and/or on the distance information reacquired in step S710 and/or step S713 described later.

Figure 8C:
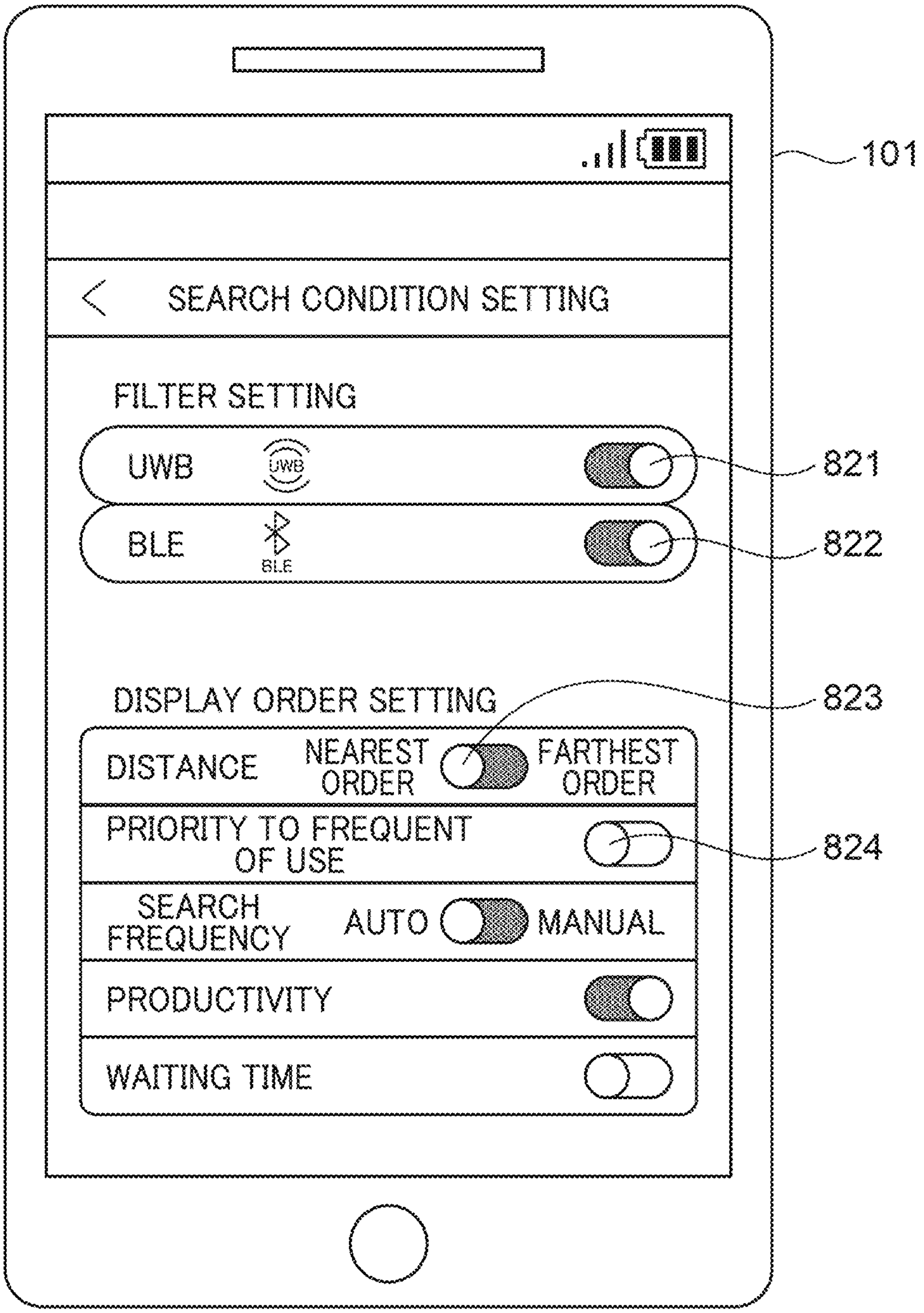

A search setting button 816 is a button for transitioning the display screen of the display 214 to the search setting screen in FIG. 8C. Therefore, in response to the tap of the search setting button 816 on the search screen of FIG. 8B, the CPU 201 of the mobile terminal 101 causes the display screen of the display 214 to transition to the search setting screen of FIG. 8C. It should be noted that the mark 817 displayed on the buttons 812 and 813 on the search screen in FIG. 8B will be described in detail later.

The search setting screen in FIG. 8C includes filter setting buttons 821 and 822, a display setting button 823, and the like. The filter setting button 821 is a toggle button for narrowing down a printer search target to image forming apparatuses capable of UWB communication. The filter setting button 822 is a toggle button for narrowing down a printer search target to image forming apparatuses capable of BLE communication. The user slides the filter setting button 821, 822 by performing a touch operation of tapping the filter setting button 821, 822. As a result, the user can switch ON/OFF of the filter setting button 821, 822.

When the filter setting button 821 is ON, an image forming apparatus capable of UWB communication is added to the target of the printer search, whereas when the filter setting button 821 is OFF, an image forming apparatus capable of UWB communication is excluded from the target of the printer search. When the filter setting button 822 is ON, an image forming apparatus capable of BLE communication is added to the target of the printer search, whereas when the filter setting button 822 is OFF, an image forming apparatus capable of BLE communication is excluded from the target of the printer search. It should be noted that, in the present embodiment, both the filter setting buttons 821 and 822 are turned on. Therefore, in the present embodiment, the image forming apparatuses 102 and 103 capable of UWB communication and the image forming apparatuses 102 to 105 capable of BLE communication are targets of the printer search. That is, the image forming apparatuses 102 to 105 are printer search targets.

The display setting button 823 is a toggle button for changing the display order of the search results of image forming apparatuses on the search screen in FIG. 8B in the order of nearest or farthest distance to the mobile terminal 101. The user slides the display setting button 823 by performing a touch operation of tapping the display setting button 823. As a result, the user can switch the display order of the search results of image forming apparatuses on the search screen in FIG. 8B between "the order of nearest distance to the mobile terminal 101" and "the order of farthest distance to the mobile terminal 101". It should be noted that the display order of the search results of the image forming apparatuses on the search screen in FIG. 8B is set by default in the order of proximity from the mobile terminal 101. The search setting screen in FIG. 8C also includes a display setting button 824 for changing the display order of the search results of image forming apparatuses on the search screen in FIG. 8B with priority given to the frequency of use of the image forming apparatuses.

The outline of the communication performed in step S702 will be described. That is, an outline of communication performed when the CPU 201 of the mobile terminal 101 searches for the image forming apparatuses 102 to 105 will be described. The CPU 201 of the mobile terminal 101 broadcasts a search request in mDNS to search for the image forming apparatuses 102 to 105 participating in the network of the wired LAN 106 and/or the network of the wireless LAN 305. Each CPU 311 of the respective image forming apparatuses 102 to 105 transmits its own IP address to the mobile terminal 101 and responds to the search request. Using the received IP address, the CPU 201 of the mobile terminal 101 requests detailed information from each of the image forming apparatuses 102 to 105 by IPP/IPPS, and further acquires the detailed information from each of the image forming apparatuses 102 to 105. It should be noted that the detailed information includes, for example, a device name and the like. In this manner, the CPU 201 of the mobile terminal 101 acquires the detailed information of each of the image forming apparatuses 102 to 105 in step S702.

However, the CPU 201 of the mobile terminal 101 cannot acquire the distance information including each distance from the mobile terminal 101 to the respective image forming apparatuses 102 to 105, only by the mDNS search in step S702. In this regard, as a method of acquiring distance information, it is conceivable to use an advertisement packet of BLE communication transmitted from the image forming apparatuses 102 to 105. That is, the CPU 201 of the mobile terminal 101 can acquire the rough distance to the respective image forming apparatuses 102 to 105, that is, the result of the BLE distance measurement, based on the received radio wave intensity of the advertisement packet of the BLE communication. However, a packet having a predetermined format, such as the AirPrint Bluetooth Beacon, cannot include unique information such as a device name. Therefore, there is a possibility that the CPU 201 of the mobile terminal 101 cannot acquire the detailed information including the device name and the like, only by using the packet used in the BLE communication.

Therefore, for the image forming apparatuses 104 and 105 compatible with only BLE, in addition to the detailed information acquired by the mDNS search, the distance calculated using the received radio wave intensity or the like of the GATT communication of BLE in step S713 described later is displayed on the search screen in FIG. 8B. On the other hand, for the image forming apparatuses 102 and 103 compatible with BLE and UWB, in addition to the detailed information acquired by the mDNS search, the result of the UWB distance measurement performed in step S710 described later is displayed on the search screen of FIG. 8B. As a result, the user can grasp each distance from the respective found image forming apparatuses 102 to 105 to the mobile terminal 101, and can grasp an apparatus relatively close to the mobile terminal 101 among the found image forming apparatuses 102 to 105.

FIG. 7 is referred to again. In step S703, the CPU 201 of the mobile terminal 101 generates a first list by using the device name and the like included in the detailed information acquired in the printer search in step S702. As described above, the first list is stored in the list storage part 409 of the print application 402. The first list will be described later in detail. In step S704, the CPU 201 of the mobile terminal 101 receives the advertisement packet of the BLE communication transmitted from each of the image forming apparatuses 102 to 105. In step S705, the CPU 201 of the mobile terminal 101 performs pairing with each of the image forming apparatuses 102 to 105, and establishes an authenticated connection for performing wireless communication using BLE between the mobile terminal 101 and each of the image forming apparatuses 102 to 105. It should be noted that, out of the image forming apparatuses 102 to 105, it is not necessary to perform pairing again for an apparatus that has already been paired with the mobile terminal 101.

In step S706, the CPU 201 of the mobile terminal 101 and each of the image forming apparatuses 102 to 105, connected with the mobile terminal 101 by wireless communication using BLE, perform GATT communication of BLE with each other, and transmit and receive information necessary for activating the print application 402 to and from each other. At that time, the image forming apparatuses 102 and 103 compatible with BLE and UWB receive the TAG information of UWB unique to the mobile terminal 101 by GATT communication of BLE. Furthermore, by the GATT communication of BLE, each of the image forming apparatuses 102 and 103 compatible with BLE and UWB transmits, to the mobile terminal 101, TAG information of UWB unique to each UWB communication unit 321. The mobile terminal 101 receives TAG information of UWB unique to each of the image forming apparatuses 102 and 103.

The TAG information of UWB is information for specifying a partner of UWB communication (a device which is a transmission source of TAG information of UWB), and is information including at least a personal area network ID (PANID) and an address defined by the IEEE 802.15.4 group. It should be noted that the TAG information of UWB may be added to the advertisement packet of the BLE communication. In addition, the CPU 201 of the mobile terminal 101 acquires the received radio wave intensity of the GATT communication of BLE (hereinafter, it may be referred to as "RSSI of BLE") for each of the image forming apparatuses 102 to 105.

Furthermore, the CPU 201 of the mobile terminal 101 acquires the following information (1) to (4) regarding the image forming apparatuses 102 to 105 respectively from the image forming apparatuses 102 to 105 by GATT communication of BLE.

(1) Information about printing capability (color, monochrome, double-sided, single-sided, etc.).

(2) Information about whether UWB communication is enabled or disabled.

(3) Information about the transmission power $P_T$ of the BLE communication unit 320 (hereinafter, referred to as "BLE transmission power $P_T$").

(4) Information about the transmission gain $G_T$ of the BLE communication unit 320 (hereinafter, referred to as "BLE transmission gain $G_T$").

It should be noted that, in the present embodiment, the CPU 201 of the mobile terminal 101 further acquires the following information (5) and (6) regarding the image forming apparatuses 102 to 105 respectively from the image forming apparatuses 102 to 105 by GATT communication of BLE.

(5) Model No.

(6) Serial No.

In step S707, the CPU 201 of the mobile terminal 101 stores the various types of information acquired in step S706 in the first list stored in the list storage part 409 of the print application 402. FIGS. 9A to 9D are diagrams showing examples of a first list 901 and a second list 902 stored in the list storage part 409 of the print application 402 of the mobile terminal 101. The first list 901 of FIG. 9A is a first list after the storage of various types of information acquired when the GATT communication of BLE is performed (step S706) is completed (step S707). The first list 901 of FIG. 9A stores, for each image forming apparatus, information about PANID, printing capability, RSSI of BLE, UWB compatible, BLE transmission power $P_T$, and BLE transmission gain $G_T$.

It should be noted that, in the item "printing capability" in the first list 901, "CL" indicates that color printing and monochrome printing are possible, and "BW" indicates that only monochrome printing is possible. "Double-sided" indicates that double-sided printing and single-sided printing are possible, and "single-sided" indicates that only single-sided printing is possible. In the item "UWB compatible" in the first list 901, "○" indicates that UWB communication is possible, and "x" indicates that UWB communication is impossible. It should be noted that the item "device name" in the first list 901 stores the device name included in the detailed information acquired by the printer search in step S702, when the first list 901 is generated in step S703.

On the other hand, the first list 901 of FIG. 9B is a first list at the time when the process proceeds to step S712 described later, that is, after the storage of the results of the distance measurement using the wireless communication by UWB is completed. In addition, the first list 901 in FIG. 9C is a first list at the time when the process proceeds to step S714 described later, that is, after the storage of the distance calculated in step S713 described later is completed. Further, in step S707, the second list 902 in FIG. 9D is generated by the CPU 201 of the mobile terminal 101. Similarly to the first list 901, the second list 902 is stored in the list storage part 409 of the print application 402. The second list 902 stores a value of a constant N and a value of an environmental variable n obtained in step S712 described later.

FIG. 7 is referred to again. The processes of steps S704 to S707 described above are repeatedly executed, and when a certain period of time has elapsed since the last storage in the first list 901, the process proceeds to step S708. It should be noted that the determination as to whether a certain period of time has elapsed is performed using a clock built in the CPU 201 of the mobile terminal 101. In step S708, the CPU 201 of the mobile terminal 101 transmits a distance measurement request packet to the image forming apparatuses 102 and 103 compatible with BLE and UWB based on the TAG information of UWB. The distance measurement request packet is a packet in a format required for performing distance measurement of TWR, defined by the IEEE 802.15.4 group. Therefore, the distance measurement request packet may be a packet including at least the distance measurement request, the address information of the request source, and the address information of the request destination.

In step S709, the CPU 311 of each of the image forming apparatuses 102 and 103 transmits a distance measurement response packet to the mobile terminal 101 when a predetermined time ($T_{reply}$ value) has elapsed from the moment of reception of the distance measurement request packet. In step S710, the CPU 201 of the mobile terminal 101 receives the distance measurement response packet to perform UWB distance measurement by the TWR distance measurement method, and obtains respective distances to the image forming apparatuses 102 and 103. In step S711, the CPU 201 of the mobile terminal 101 stores, in the first list 901, the obtained distances to the image forming apparatuses 102 and 103 as a result of UWB distance measurement.

The processes of steps S708 to S711 described above are repeatedly executed, and when the last storage of the result of UWB distance measurement into the first list 901 is performed, the process proceeds to step S712. As described above, the first list 901 of FIG. 9B is the first list at the time when the process proceeds to step S712. It should be noted that, in the first list 901 of FIG. 9B, reference numeral 911 denotes a result of UWB distance measurement indicating a distance from the mobile terminal 101 to the image forming apparatus 102. Reference numeral 912 denotes a result of UWB distance measurement indicating a distance from the mobile terminal 101 to the image forming apparatus 103.

FIG. 7 is referred to again. In step S712, the CPU 201 (deriving unit) of the mobile terminal 101 derives an "equation capable of calculating the respective distances from the mobile terminal 101 to the image forming apparatuses 104 and 105 compatible with only BLE with accuracy higher than accuracy of BLE distance measurement" (deriving step). It should be noted that, in the following description, the "equation capable of calculating the respective distances from the mobile terminal 101 to the image forming apparatuses 104 and 105 compatible with only BLE with accuracy higher than accuracy of BLE distance measurement" may be referred to as a "distance calculation equation for the image forming apparatus compatible with only BLE". In step S713, the CPU 201 (distance calculation unit) of the mobile terminal 101 calculates the respective distances from the mobile terminal 101 to the image forming apparatuses 104 and 105 compatible with only BLE using the equation derived in step S712 (distance calculation step). That is, the CPU 201 of the mobile terminal 101 calculates the respective distances from the mobile terminal 101 to the image forming apparatuses 104 and 105 compatible with only BLE using the distance calculation equation for the image forming apparatus compatible with only BLE.

Here, an outline of derivation of the equation and distance calculation performed in steps S712 and S713 will be described. That is, an outline until the respective distances from the mobile terminal 101 to the image forming apparatuses 104 and 105 compatible with only BLE are calculated with accuracy higher than the accuracy of BLE distance measurement will be described. FIG. 10 is a diagram showing a derivation process for a distance calculation equation for the image forming apparatus compatible with only BLE. That is, FIG. 10 shows a derivation process for an "equation capable of calculating the respective distances from the mobile terminal 101 to the image forming apparatuses 104 and 105 compatible with only BLE with accuracy higher than the accuracy of BLE distance measurement".

As shown in FIG. 10, in the present embodiment, the basic form of the Friis transmission equation represented by Equation 1001 is modified to derive a distance calculation equation for an image forming apparatus compatible with only BLE. As a result, in the present embodiment, a distance calculation equation for an image forming apparatus compatible with only BLE is derived from a generally known equation. Reference numeral 1002 denotes the definition of $P_R$, $P_T$, $G_T$, $G_R$, n, D, and λ used in Equation 1001. Namely, $P_R$ is the reception power, $P_T$ is the transmission power, $G_T$ is the transmission gain, $G_R$ is the reception gain, n is the environmental variable, D is the distance, and λ is the wavelength.

It should be noted that the value of the transmission power $P_T$ and the value of the transmission gain $G_T$ can be determined at the time of designing the BLE communication unit 320 and/or the UWB communication unit 321 of the image forming apparatuses 102 to 105. In this case, in step S706, the CPU 201 of the mobile terminal 101 may acquire, in addition to the transmission power $P_T$ of BLE and the transmission gain $G_T$ of BLE described above, the transmission power $P_T$ of the UWB communication unit 321 and the transmission gain $G_T$ of the UWB communication unit 321 from the respective image forming apparatuses 102 to 105.

The value of the environmental variable n is a value indicating how the radio wave travels through the space. According to the description in the box pointed to by the reference numeral 1003, the environmental variable n=2 in the ideal space. In the real space, the environmental variable n<2 is satisfied in the space in which the radio waves propagate while being reflected. In the real space, the environmental variable n>2 is satisfied in the space in which the radio waves propagate while being absorbed and attenuated. The value of the wavelength λ is obtained by multiplying the reciprocal of the frequency used in the wireless communication by the propagation speed (light speed) of the radio wave. It should be noted that a frequency of 2.4 GHz is generally used for BLE communication, and in this case, a wavelength λ≈0.12 [m].

Equation 1001 is an equation representing the reception power $P_R$ in units of [mW]. The Equation 1001 is transformed by the unit of the reception power $P_R$ being converted from [mW] to [dbm], thereby obtaining Equation 1004 representing the received radio wave intensity (hereinafter, referred to as "RSSI"). For this purpose, "10" is multiplied on both sides of Equation 1001 taking the common logarithm. In this way, Equation 1001 is transformed to obtain Equation 1004. Here, "$10\log_{10}G_T+10\log_{10}G_R+10\log_{10}P_T+10n\log_{10}\lambda$" in Equation 1004 is defined as a constant N as shown in Equation 1005. It should be noted that $10\log_{10}G_R$ of the constant N includes the reception gain $G_R$ of the mobile terminal 101.

When the constant N in Equation 1005 is substituted into Equation 1004, Equation 1006 is obtained. Equation 1006 is an equation for obtaining the RSSI using the constant N, the environmental variable n, and the distance D. When Equation 1006 is transformed into an equation represented by a true number of the common logarithm and the transformed equation is further divided by "4π", Equation 1007 representing the distance D in units of [m] is obtained. Equation 1007 is an equation for obtaining the distance D using the constant N, the RSSI, and the environmental variable n. Here, as for the distance D, BLE distance measurement can acquire only a rough value with an error of several meters at the maximum, whereas UWB distance measurement can acquire a value with an error in units of centimeters.

Therefore, for each of the image forming apparatuses 102 and 103 compatible with BLE and UWB, a simultaneous equation including two equations is generated by substituting the value of the RSSI of BLE and the value of the distance D, which is a result of the UWB distance measurement, into Equation 1006. It should be noted that values stored in the first list 901 of FIG. 9B are used as the value of the RSSI of BLE and the value of the distance D that is a result of the UWB distance measurement. By solving the simultaneous equation generated in this way, the value of the constant N and the value of the environmental variable n are obtained. The value of the constant N and the value of the environmental variable n are stored in the second list 902 of FIG. 9D. It should be noted that the value of the environmental variable n obtained as described above indicates how the radio wave is transmitted in the space in which the mobile terminal 101 and the image forming apparatuses 102 and 103 compatible with BLE and UWB are present, that is, in the space in the data processing system 100.

Then, when the value of the constant N and the value of the environmental variable n are substituted into Equation 1007, Equation 1007 becomes an "equation that can calculate the distance D in units of [m] as long as the value of the RSSI is known". Therefore, as long as the value of the RSSI of the BLE of the image forming apparatus 104 compatible with only BLE is known, the distance from the mobile terminal 101 to the image forming apparatus 104 compatible with only BLE can be calculated using an equation obtained by the value of the constant N and the value of the environmental variable n are substituted into Equation 1007. This manner is similarly applied to the calculation of the distance from the mobile terminal 101 to the image forming apparatus 105 compatible with only BLE.

FIG. 11 is a diagram showing a derivation process and a calculation result of a distance for a distance calculation equation for an image forming apparatus compatible with only BLE. That is, FIG. 11 shows a derivation process and a calculation result of a distance for an "equation capable of calculating the respective distances from the mobile terminal 101 to the image forming apparatuses 104 and 105 compatible with only BLE with accuracy higher than the accuracy of BLE distance measurement". Hereinafter, a specific process until the respective distances from the mobile terminal 101 to the image forming apparatuses 104 and 105 compatible with only BLE is calculated will be described, with reference to FIG. 11.

First, the value of the constant N and the value of the environmental variable n are obtained. For this purpose, for the image forming apparatus 102 compatible with BLE and UWB, the value of the RSSI of BLE and the value of the distance D as a result of the UWB distance measurement are read from the first list 901 of FIG. 9B, and the read values are substituted into Equation 1006 of FIG. 10. As a result, as shown in FIG. 11, Equation 1101 for the image forming apparatus 102 compatible with BLE and UWB is derived.

Similarly, for the image forming apparatus 103 compatible with BLE and UWB, the value of the RSSI of BLE and the value of the distance D as a result of the UWB distance measurement are read from the first list 901 of FIG. 9B, and the read values are substituted into Equation 1006 of FIG. 10. As a result, as shown in FIG. 11, Equation 1102 for the image forming apparatus 103 compatible with BLE and UWB is derived. From Equation 1101 and Equation 1102 derived in this way, the value of the constant N and the value of the environmental variable n are obtained. In FIG. 11, a value "−50.0" denoted by the reference numeral 1103 indicates the obtained value of the constant N. Further, a value "1.8" denoted by the reference numeral 1104 indicates the obtained value of the environmental variable n.

Next, "−50.0", which is the value of the constant N and "1.8", which is the value of the environmental variable n are substituted into Equation 1007 in FIG. 10. As a result, Equation 1105 shown in FIG. 11 is derived. Equation 1105 is a distance calculation equation for an image forming apparatus compatible with only BLE in the first embodiment. With Equation 1105, the distances from the mobile terminal 101 to the image forming apparatuses 104 and 105 compatible with only BLE are calculated using only the value of RSSI of BLE of each of the image forming apparatuses 104 and 105, with high accuracy.

For example, in a case where the distance from the mobile terminal 101 to the image forming apparatus 105 compatible with only BLE is calculated, the value of the RSSI of BLE of the image forming apparatus 105 is read from the first list 901 of FIG. 9B and substituted into Equation 1105. As a result, Equation 1106 is obtained from Equation 1105. The value "2.5 [m]" denoted by the reference numeral 1107 is a value obtained by calculating Equation 1106. That is, the value "2.5 [m]" is a value of the distance D from the mobile terminal 101 to the image forming apparatus 105 compatible with only BLE. It should be noted that, although not illustrated, the distance from the mobile terminal 101 to the image forming apparatus 104 compatible with only BLE can be obtained in a similar manner. In this case, the value of the RSSI of BLE of the image forming apparatus 104 is read from the first list 901 of FIG. 9B and substituted into Equation 1105. As a result, "4.2 [m]" is calculated as the value of the distance D from the mobile terminal 101 to the image forming apparatus 104 compatible with only BLE by Equation 1105.

Figure 12A:
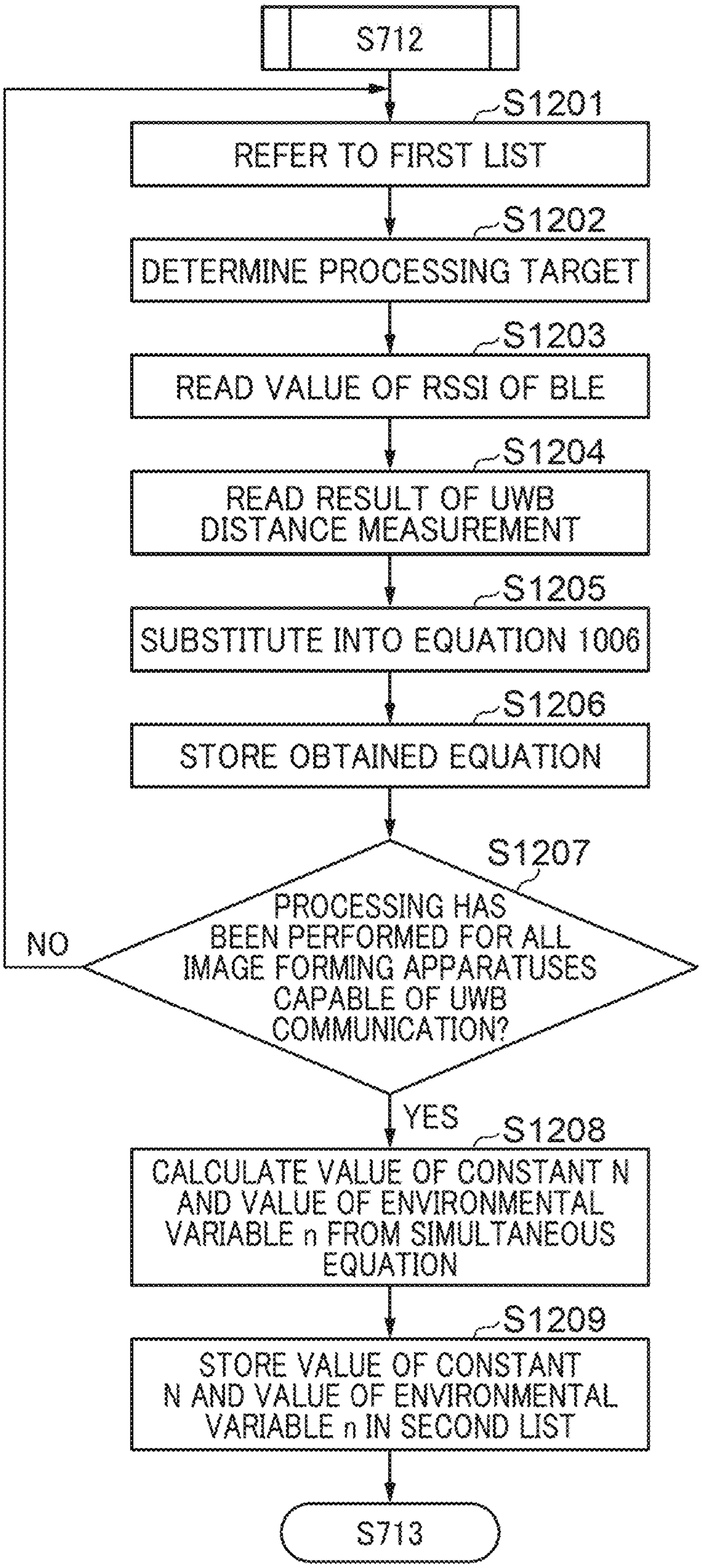
Figure 12B:
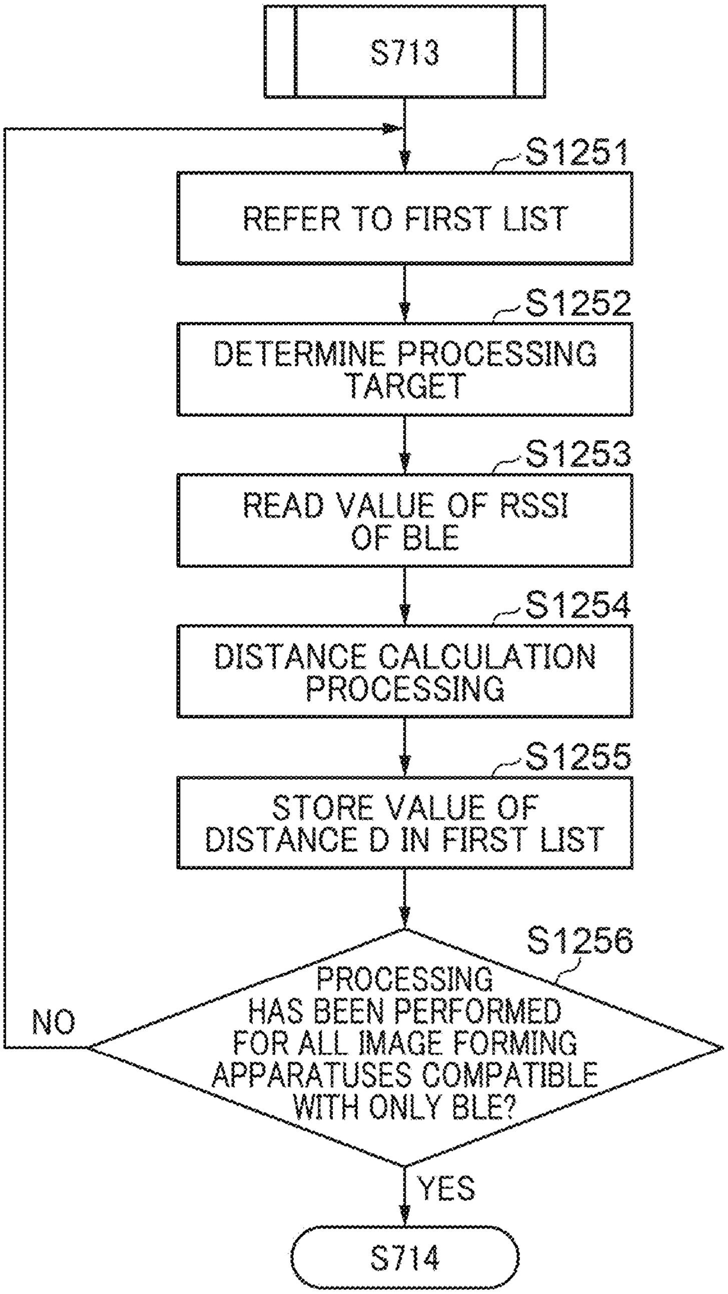

Hereinafter, the operation flows in steps S712 and S713 will be described in detail. FIG. 12A is a flowchart showing an operation in step S712. FIG. 12B is a flowchart showing an operation in step S713. First, an operation flow in step S712 will be described in detail with reference to FIG. 12A. In step S1201, the CPU 201 of the mobile terminal 101 refers to the first list 901 secured in the RAM 203. In step S1202, the CPU 201 of the mobile terminal 101 determines a processing target. Specifically, the CPU 201 determines, as a processing target, an apparatus that is capable of performing UWB communication and for which the substitution in step S1205 to be described later has not been completed yet among the image forming apparatuses 102 to 105 of which device names are stored in the first list 901. As a result, one apparatus out of the image forming apparatuses 102 and 103 compatible with BLE and UWB for which the substitution in step S1205 described later has not been completed yet is determined as a processing target.

In step S1203, the CPU 201 of the mobile terminal 101 reads, from the first list 901, the value of the RSSI of BLE of the apparatus determined as the processing target among the image forming apparatuses 102 to 105 of which device names are stored in the first list 901. In step S1204, the CPU 201 of the mobile terminal 101 reads, from the first list 901, the result of the UWB distance measurement of the apparatus determined as the processing target among the image forming apparatuses 102 to 105 of which device names are stored in the first list 901. In step S1205, the CPU 201 of the mobile terminal 101 substitutes the value of the RSSI of BLE read in step S1203 and the result of the UWB distance measurement read in step S1204 into Equation 1006. In step S1206, the CPU 201 of the mobile terminal 101 stores the equation obtained by the substitution in step S1205, into the RAM 203.

In step S1207, the CPU 201 of the mobile terminal 101 determines whether or not the processing in step S1205 has been performed for all the image forming apparatuses capable of UWB communication among the image forming apparatuses 102 to 105 of which device names are stored in the first list 901. In a case where the CPU 201 of the mobile terminal 101 determines that the processing in step S1205 has not been performed for all the image forming apparatuses capable of UWB communication among the image forming apparatuses 102 to 105 of which device names are stored in the first list 901, the process returns to step S1201. As a result, among the image forming apparatuses 102 to 105 of which device names are stored in the first list 901, processes of steps S1201 to S1206 is executed again for an apparatus capable of UWB communication and for which the substitution in step S1205 has not been completed yet. On the other hand, in a case where the CPU 201 of the mobile terminal 101 determines that the processing in step S1205 has been performed for all the image forming apparatuses capable of UWB communication among the image forming apparatuses 102 to 105 of which device names are stored in the first list 901, the process proceeds to step S1208.

In step S1208, the CPU 201 of the mobile terminal 101 calculates the value of the constant N and the value of the environmental variable n by solving simultaneous equation including the equations stored in the RAM 203 in step S1206. It should be noted that when there are three or more image forming apparatuses compatible with BLE and UWB, that is, in a case where there are three or more equations stored in the RAM 203 in step S1206, two equations constituting the simultaneous equation may be selected from the three or more equations. As a result, the two values: the value of the constant N; and the value of the environmental variable n, are reliably obtained. For example, in this case, simultaneous equation is configured by two equations for two image forming apparatuses compatible with BLE and UWB out of the three or more image forming apparatuses compatible with BLE and UWB, wherein the two image forming apparatuses compatible with BLE and UWB include an image forming apparatus compatible with BLE and UWB for which UWB distance measurement result is the smallest and an image forming apparatus compatible with BLE and UWB for which UWB distance measurement result is the second smallest. That is, simultaneous equation is configured by two equations for two image forming apparatuses compatible with BLE and UWB, of which distances to the mobile terminal 101 are the first and the second shortest. It should be noted that simultaneous equation may be configured by two equations for two image forming apparatuses compatible with BLE and UWB, for which RSSI of BLE are the first and the second largest values.

In step S1209, the CPU 201 of the mobile terminal 101 stores the value of the constant N and the value of the environmental variable n calculated in step S1208 into the second list 902 secured in the RAM 203. It should be noted that, in the second list 902 of FIG. 9D, reference numeral 931 denotes the value of the constant N calculated in step S1208. Reference numeral 932 denotes the value of the environmental variable n calculated in step S1208. Further, the CPU 201 of the mobile terminal 101 stores Equation 1105 derived by substituting the value of the constant N and the value of the environmental variable n calculated in step S1208 into Equation 1007, that is, the distance calculation equation for the image forming apparatus compatible with only BLE, into the RAM 203. Thereafter, the process proceeds to step S713.

Next, an operation flow in step S713 will be described in detail with reference to FIG. 12B. In step S1251, the CPU 201 of the mobile terminal 101 refers to the first list 901 secured in the RAM 203. In step S1252, the CPU 201 of the mobile terminal 101 determines a processing target. Specifically, the CPU 201 determines, as a processing target, an apparatus that is compatible with only BLE and for which the processing in step S1254 to be described later has not been completed yet among the image forming apparatuses 102 to 105 of which device names are stored in the first list 901. As a result, one apparatus out of the image forming apparatuses 104 and 105 compatible with only BLE for which the processing in step S1254 to be described later has not yet been completed is determined as a processing target.

In step S1253, the CPU 201 of the mobile terminal 101 reads, from the first list 901, the value of the RSSI of BLE of the apparatus determined as the processing target among the image forming apparatuses 102 to 105 of which device names are stored in the first list 901. In step S1254, the CPU 201 of the mobile terminal 101 performs distance calculation processing for the apparatus determined as the processing target among the image forming apparatuses 102 to 105 of which device names are stored in the first list 901, and obtains the value of the distance D. Specifically, in the distance calculation processing, the CPU 201 of the mobile terminal 101 substitutes the value of the RSSI of BLE read in step S1253 into Equation 1105 stored in the RAM 203 in step S1209, that is, into the distance calculation equation for the image forming apparatus compatible with only BLE.

It should be noted that, the CPU 201 of the mobile terminal 101 may substitute, in the distance calculation processing, the value of the constant N and the value of the environmental variable n, which are stored in the second list 902 in step S1209, and the value of the RSSI of BLE read in step S1253, into Equation 1007. In this manner, the CPU 201 of the mobile terminal 101 calculates the value of the distance D for the apparatus determined as the processing target among the image forming apparatuses 102 to 105 of which device names are stored in the first list 901. It should be noted that the "value of the distance D for the apparatus determined as the processing target" is a value of the distance from the mobile terminal 101 to the apparatus determined as the processing target. In step S1255, the CPU 201 of the mobile terminal 101 stores the value of the distance D calculated in step S1254 into the first list 901 secured in the RAM 203 as the calculated distance for the image forming apparatus compatible with only BLE.

In step S1256, the CPU 201 of the mobile terminal 101 determines whether or not the processing in step S1254 has been performed for all the image forming apparatuses compatible with only BLE among the image forming apparatuses 102 to 105 of which device names are stored in the first list 901. In a case where the CPU 201 of the mobile terminal 101 determines that the processing in step S1254 has not been performed for all the image forming apparatuses compatible with only BLE among the image forming apparatuses 102 to 105 of which device names are stored in the first list 901, the process returns to step S1251. As a result, the processing in steps S1251 to S1255 is executed again for an apparatus that is compatible with only BLE and for which the processing in step S1254 has not been completed yet among the image forming apparatuses 102 to 105 of which device names are stored in the first list 901. On the other hand, in a case where the CPU 201 of the mobile terminal 101 determines that the processing in step S1254 has been performed for all the image forming apparatuses compatible with only BLE among the image forming apparatuses 102 to 105 of which device names are stored in the first list 901, the process proceeds to step S714.

As described above, the first list 901 in FIG. 9C is the first list at the time when the process proceeds to step S714. It should be noted that, in the first list 901 of FIG. 9C, reference numeral 921 denotes a calculated distance for the image forming apparatus compatible with only BLE, which indicates a distance from the mobile terminal 101 to the image forming apparatus 104. Reference numeral 922 denotes a calculated distance for the image forming apparatus compatible with only BLE, which indicates a distance from the mobile terminal 101 to the image forming apparatus 105.

FIG. 7 is referred to again. In step S714, the CPU 201 of the mobile terminal 101 displays the search result of the image forming apparatus and the like by reflecting the content of the first list 901 in FIG. 9C in the display content of the search screen on the display 214. As a result, the display screen of the display 214 of the mobile terminal 101 transitions to the search screen in FIG. 8B described above. As a result, the search results of the image forming apparatus are displayed on the display 214 of the mobile terminal 101 in order of nearest distance to the mobile terminal 101. Further, in each search results of the image forming apparatus, each distance of the image forming apparatus from the mobile terminal 101 is displayed together on the display 214 of the mobile terminal 101.

In the search screen of FIG. 8B, the buttons 811 to 814 constitutes a list of search results of the image forming apparatus. On the button 811, information on the found image forming apparatus 103 (hereinafter, referred to as "device information") such as an icon, a logo/character(s) indicating supported wireless communication, a character(s) indicating printing capability, a model number, and/or a value indicating a distance to the mobile terminal 101 is displayed. Similarly, device information on the found image forming apparatus 105 is displayed on the button 812. Device information on the found image forming apparatus 104 is displayed on the button 813. Device information on the found image forming apparatus 102 is displayed on the button 814.

It should be noted that, among the device information on the image forming apparatuses 102 and 103, the icon, the logo/character indicating supported wireless communication, the character indicating printing capability, and the model number correspond to "information on the first image forming apparatus". Furthermore, among the device information on the image forming apparatuses 102 and 103, the distance to the mobile terminal 101 is a result of UWB distance measurement and corresponds to the "result of distance measurement by second wireless communication". Among the device information on the image forming apparatuses 104 and 105, the icon, the logo/character indicating supported wireless communication, the character indicating printing capability, and the model number correspond to "information on the second image forming apparatus". Among the device information on the image forming apparatuses 104 and 105, the distance to the mobile terminal 101 is a distance calculated using Equation 1105, which is a distance calculation equation for an image forming apparatus compatible with only BLE, and corresponds to the "distance to the second image forming apparatus" calculated by the distance calculation unit.

It should be noted that marks 817 displayed on the buttons 812 and 813 indicate that the value indicating the distance to the mobile terminal 101 is a value calculated by Equation 1105, which is a distance calculation equation for an image forming apparatus compatible with only BLE. As a result, the user can distinguish, based on the presence or absence of the mark 817, whether the value indicating the distance to the mobile terminal 101 is the result of the UWB distance measurement or the value calculated by Equation 1105, which is a distance calculation equation for an image forming apparatus compatible with only BLE.

FIG. 7 is referred to again. In step S715, the CPU 201 of the mobile terminal 101 receives a touch operation by which the user selects an image forming apparatus to be a print instruction target from among search results of image forming apparatuses via respective buttons 811 to 814 on the search screen of FIG. 8B. Therefore, when the user taps the button 811, the user can select the image forming apparatus 103 of which an icon is displayed on the button 811 as the print instruction target. When the user taps the button 812, the user can select the image forming apparatus 105 of which an icon is displayed on the button 812 as the print instruction target. When the user taps the button 813, the user can select the image forming apparatus 104 of which an icon is displayed on the button 813 as the print instruction target. When the user taps the button 814, the user can select the image forming apparatus 102 of which an icon is displayed on the button 814 as the print instruction target.

Figure 8D:
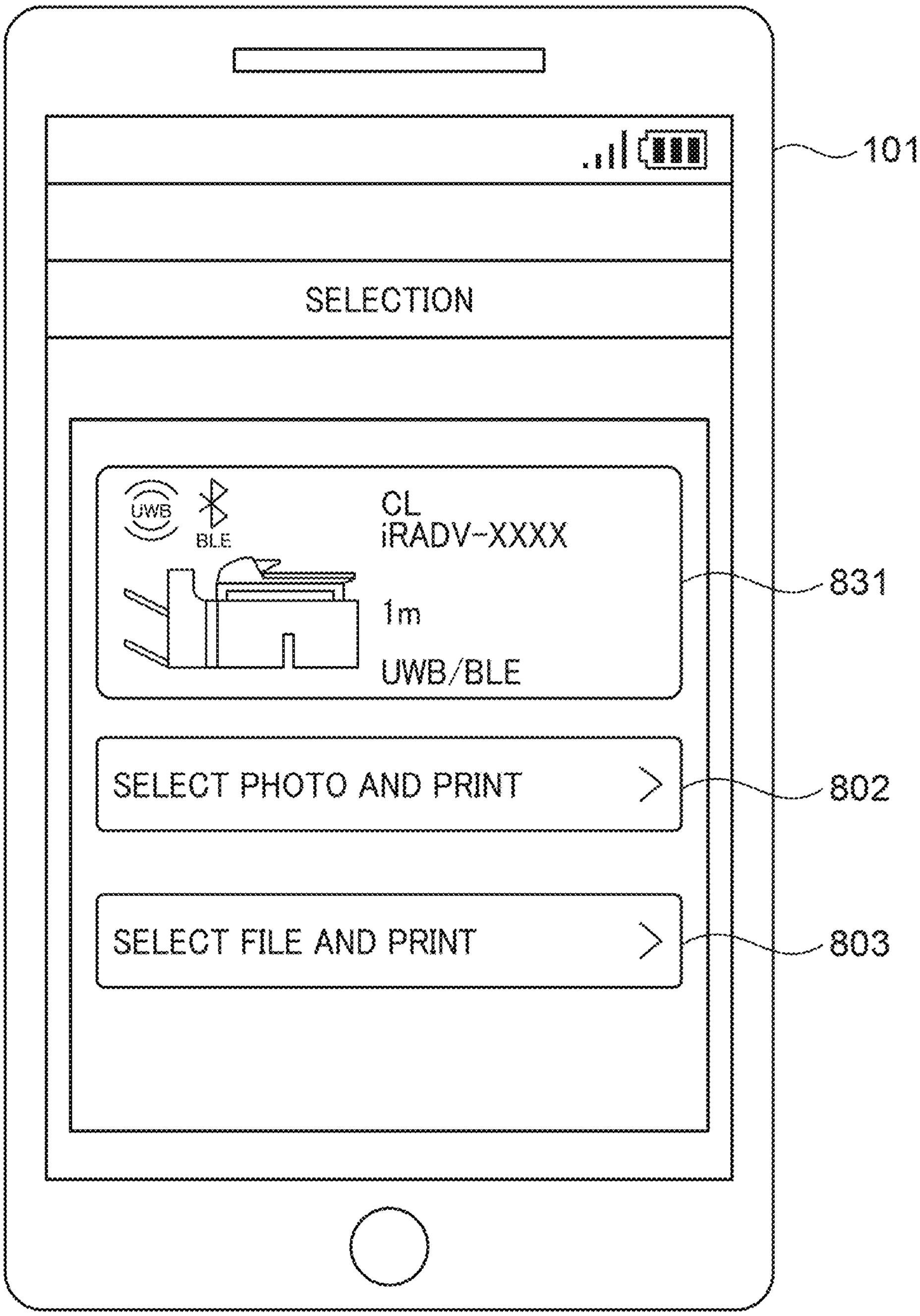

In this manner, when the user selects an image forming apparatus to be a print instruction target, the CPU 201 of the mobile terminal 101 causes the display screen of the display 214 to transition to the selection screen in FIG. 8D. It should be noted that the selection screen of FIG. 8D is a selection screen in a case where the button 811 is tapped on the search screen in FIG. 8B and the image forming apparatus 103 is selected as a print instruction target. Hereinafter, as an example, a case where the image forming apparatus 103 is selected as a print instruction target will be described. The selection screen of FIG. 8D includes a button 831, the above-described buttons 802 and 803, and the like. On the button 831, device information on the image forming apparatus 103 selected by the user as a print instruction target is displayed in the similar manner to the respective buttons 811 to 814 on the search screen in FIG. 8B. Therefore, in the present embodiment, on the selection screen in FIG. 8D, the same device information as that on the button 811 on the search screen in FIG. 8B is displayed on the button 831. It should be noted that the button 831 may display information such as a serial number and an IP address of the image forming apparatus 103 selected by the user as a print instruction target.

FIG. 7 is referred to again. In step S716, the CPU 201 of the mobile terminal 101 receives, via the buttons 802 and 803 in the selection screen in FIG. 8D, a touch operation by which the user selects a photo or a file to be printed as a print target. Then, when the print target is selected by the user's touch operation, the process proceeds to step S717. In step S717, the CPU 201 of the mobile terminal 101 causes the display screen of the display 214 to transition to the print screen of FIG. 8E.

Figure 8E:
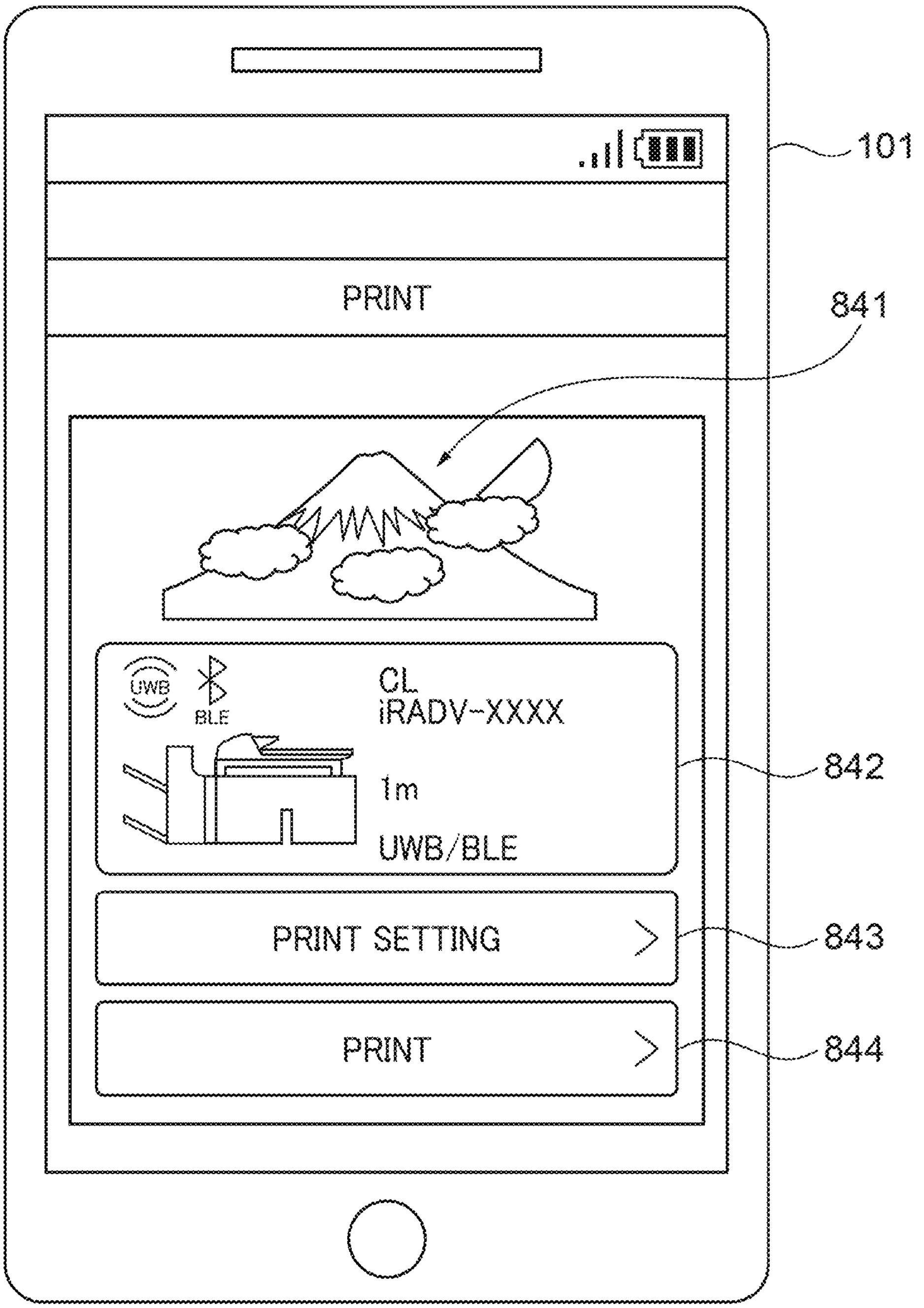

The print screen in FIG. 8E includes a display area 841 and buttons 842, 843, 844, and the like. In the display area 841, print contents based on the print target selected by the user are displayed. Thus, the user can check the print contents before printing. In addition, when the user taps the display area 841, the user can select again, as a print target, a photo or a file to be printed. The button 842 displays device information of the image forming apparatus selected by the user as a print instruction target. As a result, the user can check details of the image forming apparatus as a print instruction target before printing. Further, when the button 842 is tapped, the display screen of the display 214 transitions to the search screen in FIG. 8B. As a result, the user can select the image forming apparatus to be the print instruction target again. It should be noted that the button 842 displays the same device information as that on the button 831 on the selection screen in FIG. 8D. That is, the button 842 displays device information of the image forming apparatus 103.

Figure 8F:
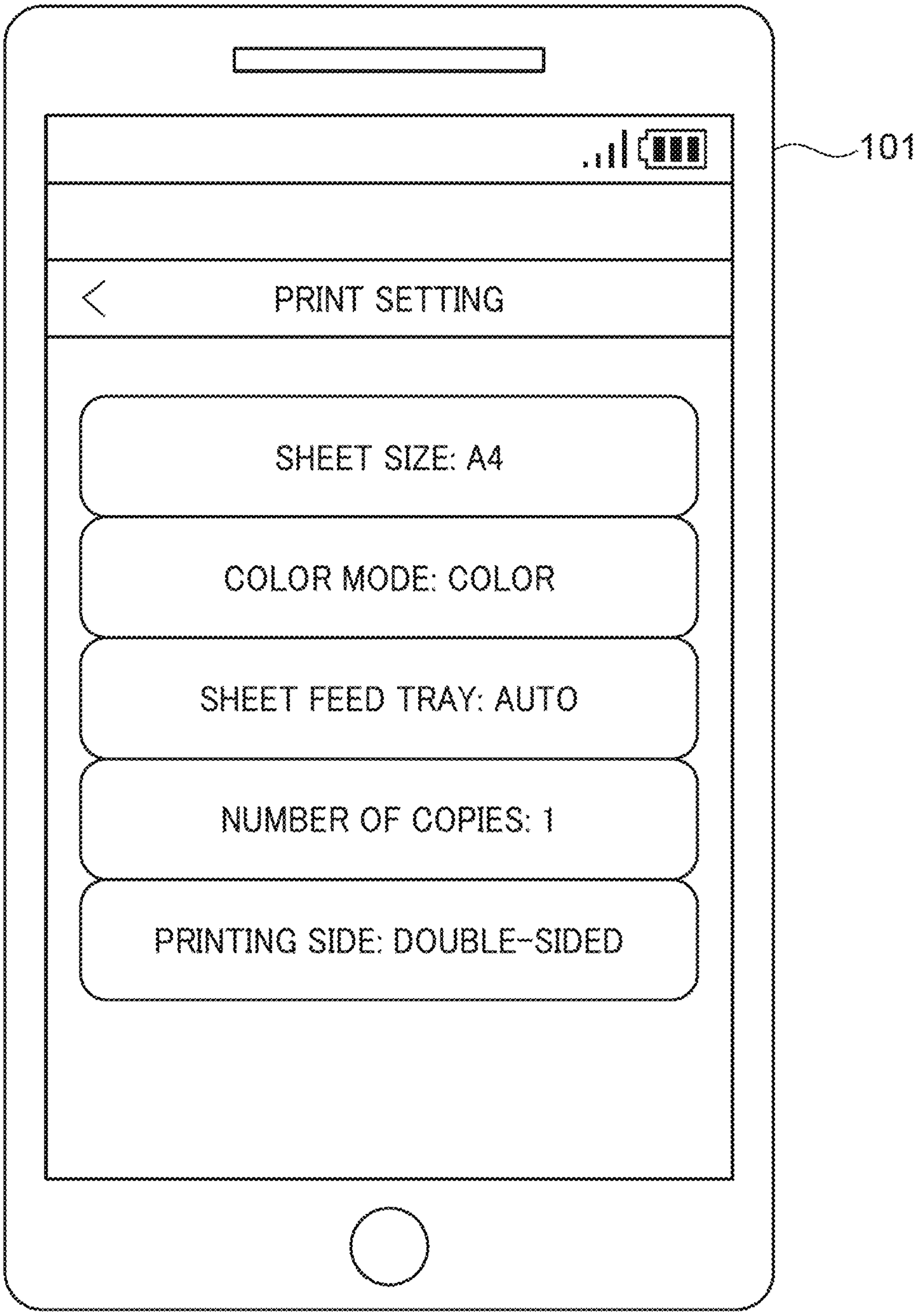

The button 843 is a button for transitioning the display screen of the display 214 to the print setting screen in FIG. 8F. Therefore, in response to the tap of the button 843 on the print screen in FIG. 8E, the CPU 201 of the mobile terminal 101 causes the display screen of the display 214 to transition to the print setting screen in FIG. 8F. It should be noted that, on the print setting screen on FIG. 8F, the user can perform, according to the purpose of printing, detailed print settings such as a sheet size, a color mode, a sheet feeding tray, a number of copies, and a printing surface. In the print screen in FIG. 8E, the button 844 is a button for starting printing.

The CPU 201 of the mobile terminal 101 receives, via the button 844, a touch operation by which the user issues an instruction for printing.

FIG. 7 is referred to again. When the CPU 201 of the mobile terminal 101 receives a touch operation for instructing printing from the user (step S717), the process proceeds to step S718. In step S718, the CPU 201 of the mobile terminal 101 transmits a print job or the like to the image forming apparatus as a print instruction target, in response to the tap of the button 844 on the print screen in FIG. 8E. It should be noted that, in the present embodiment, a print job or the like is transmitted to the image forming apparatus 103 selected as a print instruction target. In step S719, the CPU 311 of the image forming apparatus 103 performs printing based on the received print job or the like. Thereafter, the operation process of FIG. 7 ends.

As described above, when the operation process of FIG. 7 is performed in the data processing system 100, the mobile terminal 101 calculates the distance from the mobile terminal 101 to the image forming apparatus 104 compatible with only BLE by using the result of UWB distance measurement between the mobile terminal 101 and the image forming apparatuses 102 and 103 compatible with BLE and UWB. As a result, in the data processing system 100, the distance from the mobile terminal 101 to the image forming apparatus 104 is calculated with accuracy higher than the accuracy of BLE distance measurement, even in a case where distance measurement using wireless communication cannot be performed accurately because the image forming apparatus 104 as a distance measurement target is compatible with only BLE. This manner is similarly applied to the calculation of the distance from the mobile terminal 101 to the image forming apparatus 105 compatible with only BLE. In this way, the accuracy of distance measurement using wireless communication in the data processing system 100 can be improved.

Furthermore, the data processing system 100 can cause the mobile terminal 101 to display the respective distances from the mobile terminal 101 to the image forming apparatuses 102 to 105 with a value with accuracy higher than accuracy of BLE distance measurement. Therefore, the user carrying the mobile terminal 101 can grasp the respective distances to the image forming apparatuses 102 to 105 with a value with the accuracy higher than the accuracy of BLE distance measurement, and then select an apparatus that performs printing based on the print job of the mobile terminal 101 from among the image forming apparatuses 102 to 105.

It should be noted that, in a case where there is only one image forming apparatus compatible with BLE and UWB around the mobile terminal 101 carried by the user (although there are two image forming apparatuses in the present embodiment), the value of the environmental variable n is assumed to be "2", which is the value in the ideal space (n=2). Then, the value of the environmental variable n (n=2) is substituted into Equation 1006, in addition to the value of the RSSI of BLE and the value of the distance D that is the result of the UWB distance measurement for the one image forming apparatus compatible with BLE and UWB, whereby the value of the constant N is calculated. Furthermore, the value of the constant N calculated in this manner and the value of the environmental variable n (n=2) are substituted into Equation 1007, whereby a distance calculation equation for an image forming apparatus compatible with only BLE is calculated. Therefore, even when there is only one image forming apparatus compatible with BLE and UWB around the mobile terminal 101, in the data processing system 100, the distance from the mobile terminal 101 to the image forming apparatus compatible with only BLE is calculated with accuracy higher than the accuracy of BLE distance measurement.

In addition, in the first embodiment, the received radio wave intensity of the GATT communication of BLE is substituted into Equation 1006 as the value of the RSSI of BLE. However, instead of the received radio wave intensity of the GATT communication, the received radio wave intensity of the advertisement packet may be substituted into Equation 1006. This manner is similarly applied to the second and third embodiments described later.

Figure 13:
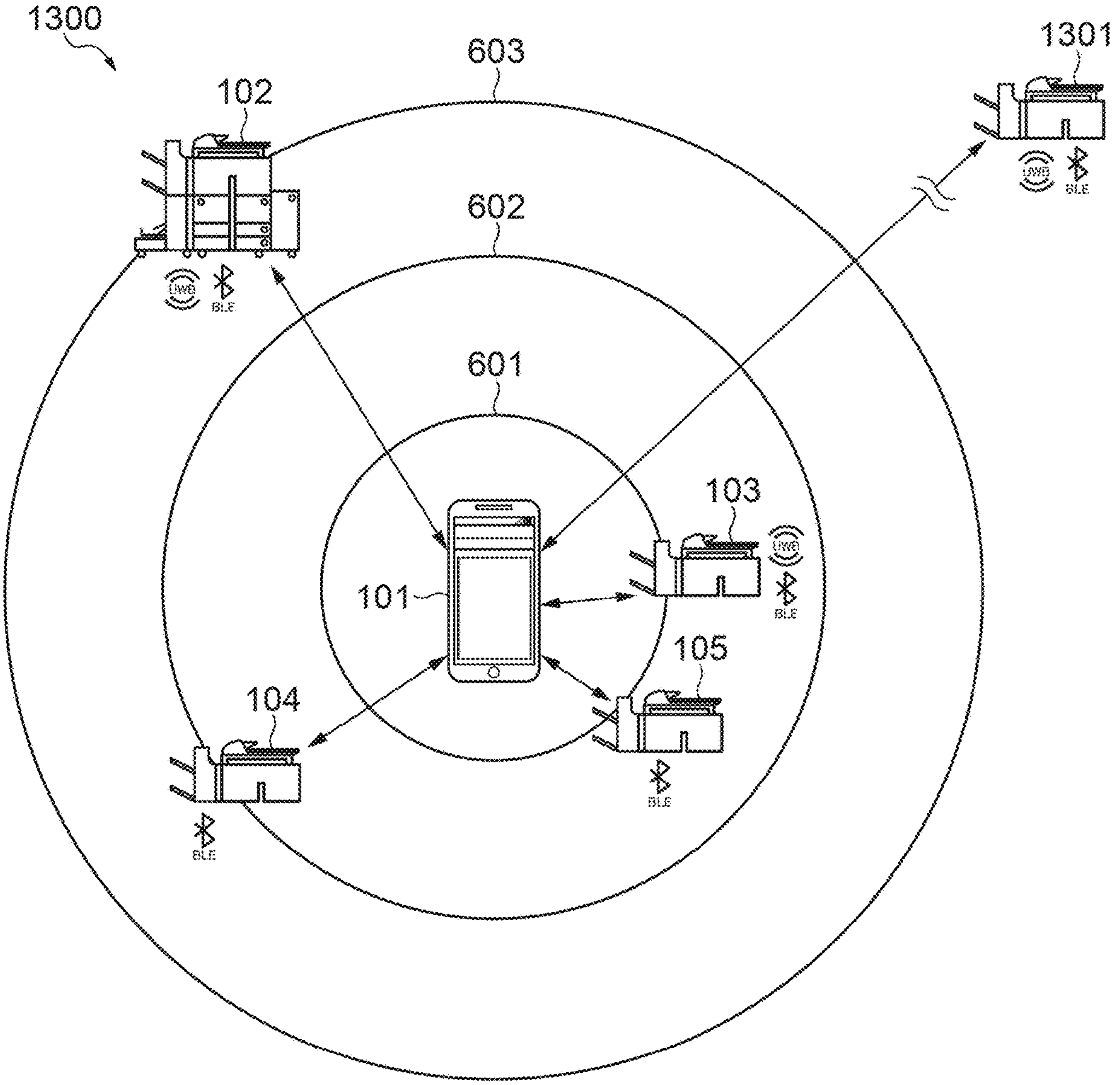
FIG. 13 is a schematic diagram showing a rough positional relationship between a mobile terminal and image forming apparatuses in a data processing system according to a second embodiment.

Hereinafter, a second embodiment will be described with reference to FIGS. 13 to 14. Here, differences from the first embodiment will be mainly described. FIG. 13 is a schematic diagram showing a rough positional relationship between the mobile terminal 101 and the respective image forming apparatuses 102 to 105 and 1301 in a data processing system 1300 according to the second embodiment. In the data processing system 1300 according to the second embodiment, there is an image forming apparatus 1301 compatible with BLE and UWB in addition to the image forming apparatuses 102 to 105 described above around the mobile terminal 101 held by the user. The image forming apparatus 1301 has the same configuration and function as those of the image forming apparatus 103. The image forming apparatus 1301 is an apparatus which is present at an extremely far position among terminals and apparatuses that transmit an advertisement packet of BLE communication received by the mobile terminal 101.

It is generally known that the accuracy of distance measurement using wireless communication decreases as the transmitting device and the receiving device are separated further away from each other, that is, as the measurement distance increases. In addition, it is generally known that the value of the received radio wave intensity becomes a more uncertain value as the transmitting device and the receiving device are separated further away from each other. Therefore, the result of the UWB distance measurement and the value of the RSSI of BLE for the device/terminal, which is present at a position extremely far from the mobile terminal 101, have low reliability, and thus tends to be noise in the calculation of the distance in step S713, when being used in the process of deriving the distance calculation equation for the image forming apparatus compatible with only BLE. Therefore, in the second embodiment, the image forming apparatus compatible with BLE and UWB for which the result of the UWB distance measurement is equal to or greater than a threshold value is deleted from the first list 901 of FIG. 9B.

Figure 14:
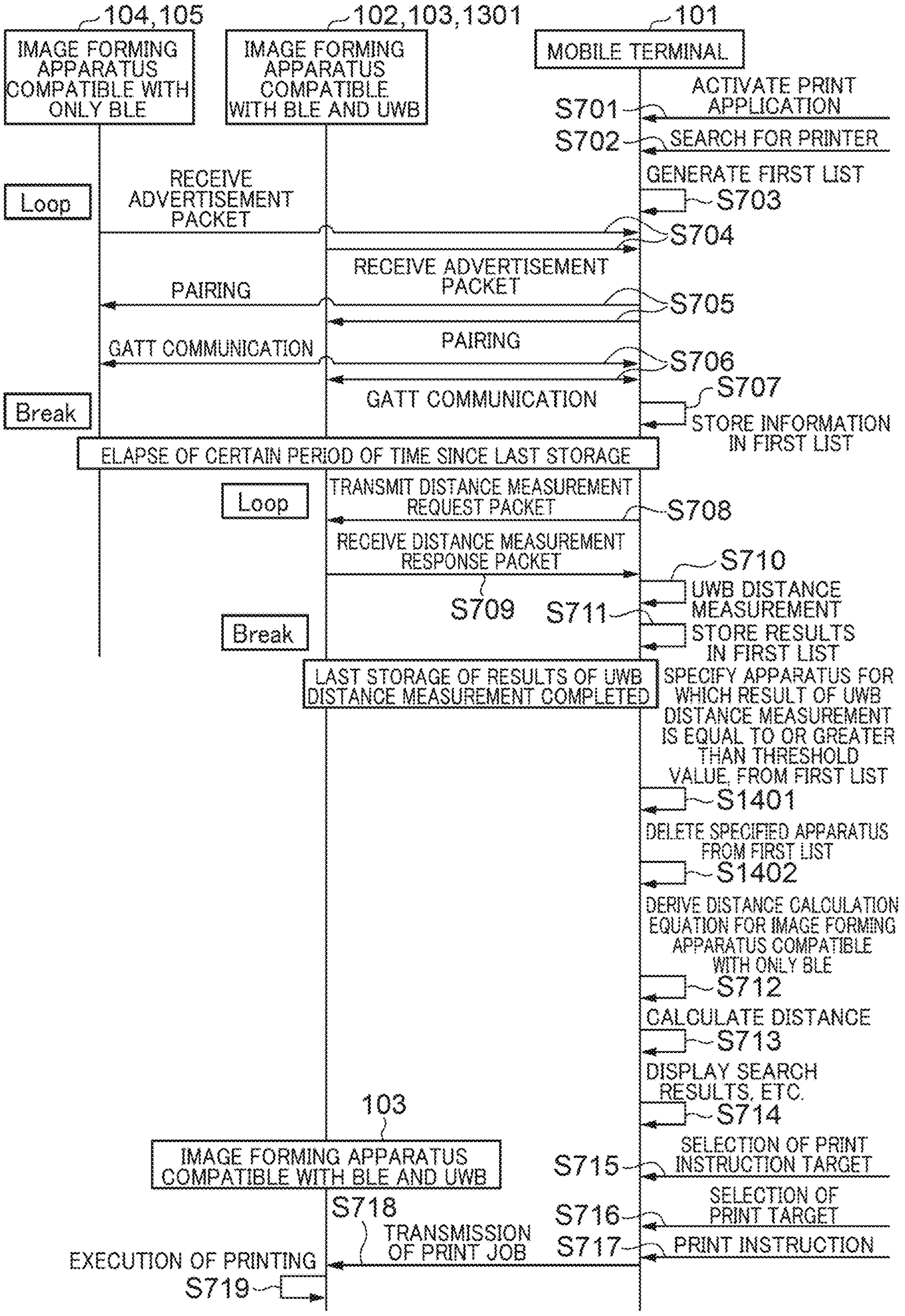
FIG. 14 is a sequence diagram showing an operation process of mobile printing in the second embodiment.

FIG. 14 is a sequence diagram showing an operation process of mobile printing in the second embodiment. Specifically, this operation process is a process performed by the mobile terminal 101 compatible with BLE and UWB, with the image forming apparatuses 102, 103, and 1301 compatible with BLE and UWB or with the image forming apparatuses 104 and 105 compatible with only BLE. Similarly to FIG. 7, FIG. 14 shows an operation process which is performed by the mobile terminal 101 and each of image forming apparatuses 102 to 105 and 1301 cooperating and working together via mutual communication, until the printing operation of the image forming apparatus 103 that has received the print job is completed. Therefore, in the operation process, when the user who operates the mobile terminal 101 starts the print application 402 on the mobile terminal 101 and then the image forming apparatus 103 is found and then selected by the user, the print job is transmitted to the image forming apparatus 103.

The operation process of FIG. 14 is basically similar to the operation process of FIG. 7. However, in the operation process of FIG. 14, steps S1401 and S1402 are added between steps S711 and S712 with respect to the operation process of FIG. 7.

The processes of steps S708 to S711 are repeatedly executed, and when the last storage of the result of UWB distance measurement into the first list 901 is performed, the process proceeds to step S1401. In step S1401, the CPU 201 of the mobile terminal 101 refers to the first list 901 of FIG. 9B, and specifies an image forming apparatus compatible with BLE and UWB for which the result of the UWB distance measurement is equal to or greater than the threshold value. The threshold value is determined in advance from the viewpoint of reducing noise in calculation of the distance in step S713, and is installed in the ROM 202 together with the print application 402. As a result, the CPU 201 of the mobile terminal 101 specifies the image forming apparatus 1301 compatible with BLE and UWB which is present at a position extremely far from the mobile terminal 101.

In step S1402, the CPU 201 of the mobile terminal 101 deletes the image forming apparatus compatible with BLE and UWB specified in step S1401 from the first list 901 of FIG. 9B. As a result, the CPU 201 of the mobile terminal 101 deletes the image forming apparatus 1301 compatible with BLE and UWB for which the result of the UWB distance measurement is equal to or greater than the threshold value, from the first list 901 of FIG. 9B. In this manner, in the second embodiment, the derivation of the equation in step S712 and the distance calculation in step S713 are performed based on the first list 901 of FIG. 9B from which the image forming apparatus 1301 compatible with BLE and UWB, for which the result of the UWB distance measurement is equal to or more than the threshold value, and which is present at a position extremely far from the mobile terminal 101, has been excluded.

As described above, the operation process of FIG. 14 is performed in the data processing system 1300. As a result, it is possible to prevent the value of the constant N and the value of the environmental variable n from being obtained from the simultaneous equation including the equations obtained by substituting the result of the UWB distance measurement and the value of the RSSI of BLE, with a low reliability, into Equation 1006. As a result, the accuracy of distance measurement using wireless communication in the data processing system 1300 can be further improved.

It should be noted that, in the second embodiment, instead of the image forming apparatus compatible with BLE and UWB for which the result of the UWB distance measurement is equal to or greater than the threshold value, the image forming apparatus compatible with BLE and UWB for which the value of the RSSI of BLE is equal to or less than another threshold value may be deleted from the first list 901 of FIG. 9B. Also in this case, another threshold value is determined in advance from the viewpoint of reducing noise in calculation of the distance in step S713, and is installed in the ROM 202 together with the print application 402. In addition, in order to avoid a case where the image forming apparatus deleted from the first list 901 of FIG. 9B is found again in step S702 after the deletion, the image forming apparatus that has been deleted from the first list 901 since the start of the current operation process may be deleted from the first list 901 of FIG. 9A in step S703 or step S707, for example.

Figure 15:
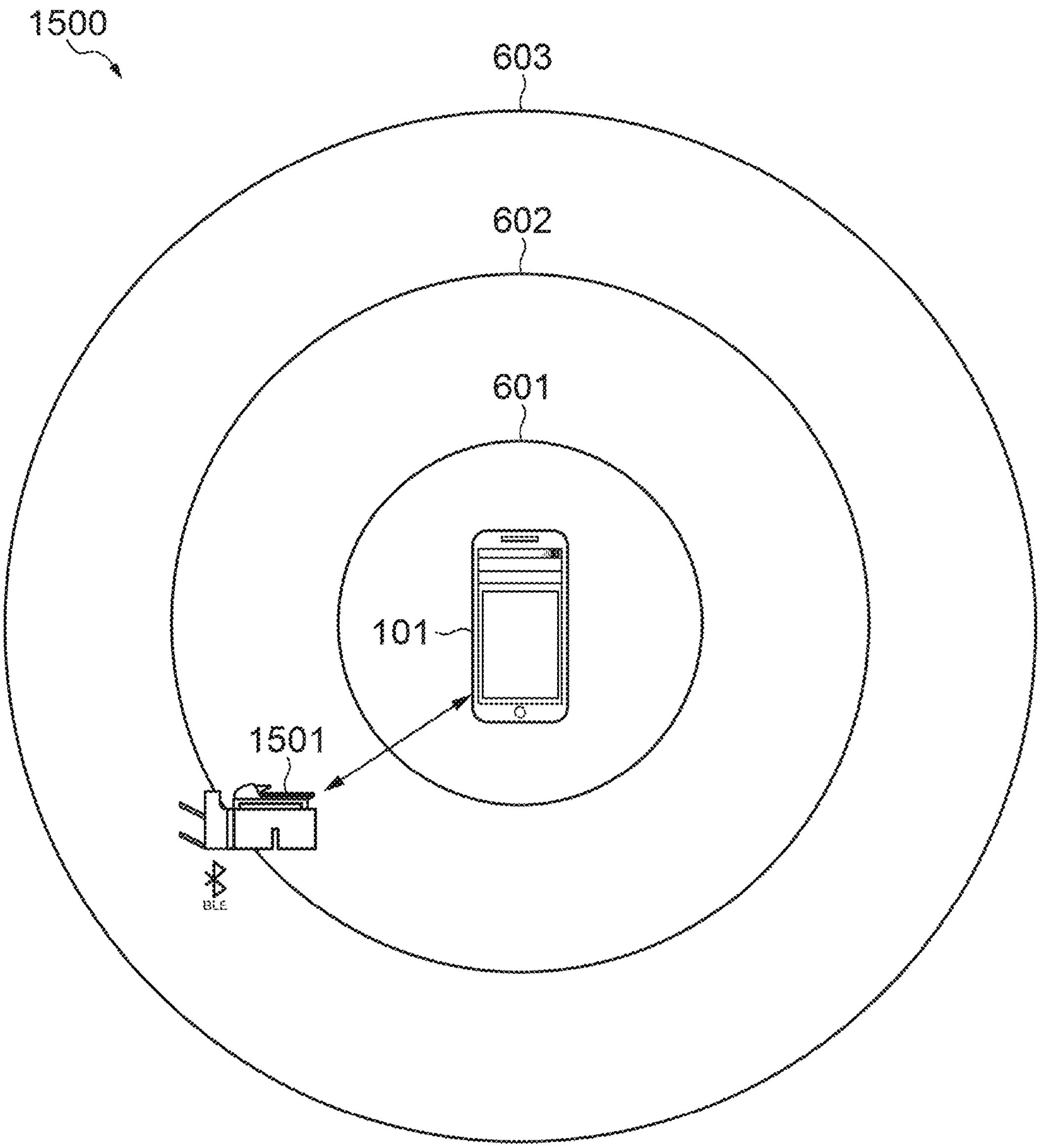
FIG. 15 is a schematic diagram showing a rough positional relationship between a mobile terminal and an image forming apparatus compatible with only BLE in a data processing system according to a third embodiment.

Hereinafter, a third embodiment will be described with reference to FIGS. 15 to 17. Here, differences from the first embodiment will be mainly described. FIG. 15 is a schematic diagram showing a rough positional relationship between the mobile terminal 101 and an image forming apparatus 1501 compatible with only BLE in a data processing system 1500 according to the third embodiment. In the data processing system 1500 according to the third embodiment, only an image forming apparatus 1501 compatible with only BLE (third image forming apparatus) is present around the mobile terminal 101 held by the user.

The image forming apparatus 1501 has the same configuration and function as those of the image forming apparatus 103. In the third embodiment, as is distinct from the first embodiment, there is no image forming apparatus compatible with BLE and UWB around the mobile terminal 101. Therefore, it is impossible to obtain the value of the RSSI of BLE and/or the result of the UWB distance measurement and impossible to, therefore, solve the simultaneous equation derived from Equation 1006 to obtain the value of the constant N and the value of the environmental variable n. Therefore, in the third embodiment, the value of N unique to the mobile terminal 101 is obtained based on the following idea.

Equation 1005 indicating the constant N includes the transmission gain $G_T$, the reception gain $G_R$, the transmission power $P_T$, the environmental variable n, and the wavelength λ. Since the values of the transmission gain $G_T$ and the transmission power $P_T$ depend on the performance of the BLE communication unit of the image forming apparatus, it is possible to set the values including variations at the time of designing the image forming apparatus. The value of the reception gain $G_R$ is a value indicating the antenna performance of the mobile terminal, and is different for each mobile terminal. As described above, the value of the wavelength λ is obtained by multiplying the reciprocal of the frequency used in the wireless communication by the propagation speed (light speed) of the radio wave. A frequency of 2.4 GHz is generally used for BLE communication, and in this case, a wavelength $\lambda \approx 0.12$ [m]. The value of the environmental variable n is assumed to be "2" in the ideal space (n=2).

Therefore, when it is assumed that the values of the transmission gain $G_T$ and the transmission power $P_T$ are unified across the products by the manufacturer at the time of designing the image forming apparatus, the value of the constant N depends only on the value of the reception gain $G_R$, which indicates the antenna performance when the mobile terminal receives the radio wave. Therefore, the value of the constant N can be interpreted as an indicator indicating the reception capability of the antenna of the mobile terminal held by the user. In the third embodiment, based on the above idea, the value of the constant N unique to the mobile terminal 101 is obtained. Then, by substituting the value of the constant N unique to the mobile terminal 101 and the environmental variable n in the ideal space (n=2) into Equation 1007, a distance calculation equation for an image forming apparatus compatible with only BLE is derived.

FIG. 16 is a diagram showing Equation 1601 for obtaining a value of a constant N unique to the mobile terminal 101, in the third embodiment. Equation 1601 is derived by transforming Equation 1006 such that the left side is only the constant N.

In the third embodiment, first, a user carrying a mobile terminal 101 starts a print application 402 in an environment where image forming apparatuses 102 and 103 compatible with BLE and UWB are present, such as in the data processing system 100 according to the first embodiment. Thus, the mobile terminal 101 completes the first list 901 of FIG. 9C. Thereafter, the mobile terminal 101 reads, from the first list 901 of FIG. 9C, the value of the RSSI of BLE and the result of the UWB distance measurement for the image forming apparatus 103 for which a result of the UWB distance measurement is smaller among the image forming apparatuses 102 and 103 compatible with BLE and UWB. Further, the mobile terminal 101 substitutes the read value of the RSSI of BLE and the read result of the UWB distance measurement for the image forming apparatus 103, and the environmental variable n=2, into Equation 1601. In this manner, the value of the constant N unique to the mobile terminal 101 is obtained, that is, the value of the constant N indicating the reception capability of the antenna of the mobile terminal 101 held by the user is obtained.

Then, the value of the constant N unique to the mobile terminal 101 is stored in the RAM 203 and/or the storage device 209 of the mobile terminal 101. Therefore, even if the mobile terminal 101 afterwards moves to an environment as in the data processing system 1500 according to the third embodiment, where only the image forming apparatus 1501 compatible with only BLE is present around the mobile terminal 101, the value of the constant N unique to the mobile terminal 101 can be used.

In this case, the mobile terminal 101 derives a distance calculation equation for an image forming apparatus compatible with only BLE by substituting the value of the constant N unique to the mobile terminal 101 and the environmental variable n=2 in the ideal space into Equation 1007. Further, the mobile terminal 101 calculates the distance D from the mobile terminal 101 to the image forming apparatus 1501 by substituting the value of the RSSI of BLE of the image forming apparatus 1501 into the derived distance calculation equation for the image forming apparatus compatible with only BLE. In this manner, the mobile terminal 101 can calculate the distance from the mobile terminal 101 to the image forming apparatus 1501 compatible with only BLE with accuracy higher than the accuracy of BLE distance measurement even in an environment where only the image forming apparatus 1501 compatible with only BLE is present around the mobile terminal 101.

Figure 17:
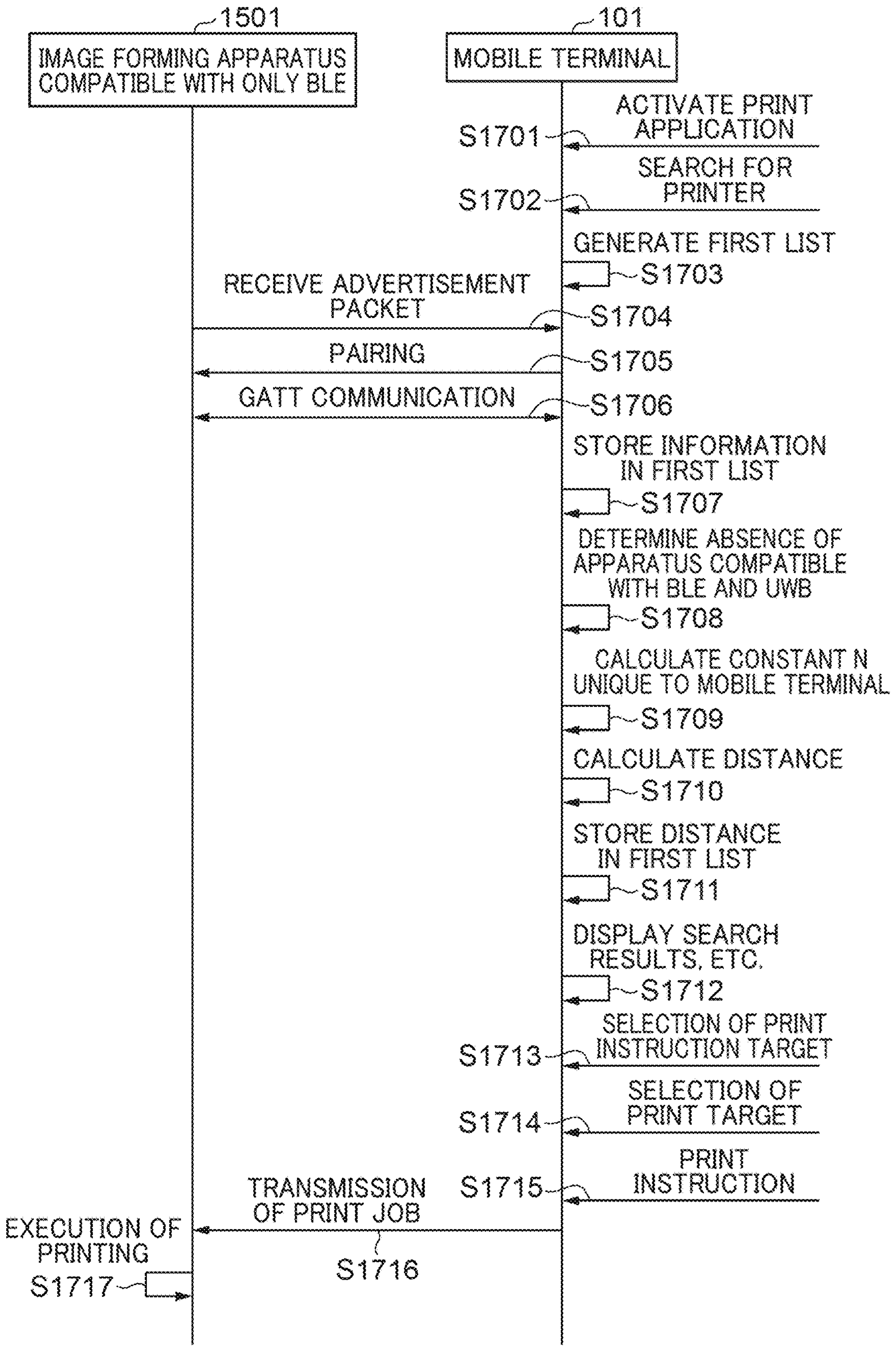
FIG. 17 is a sequence diagram showing an operation process of mobile printing in the third embodiment.

FIG. 17 is a sequence diagram showing an operation process of mobile printing in the third embodiment. Specifically, this operation process is a process performed by the mobile terminal 101 compatible with BLE and UWB, with the image forming apparatus 1501 compatible with only BLE. FIG. 17 shows an operation process which is performed by the mobile terminal 101 and the image forming apparatus 1501 cooperating and working together via mutual communication, until the printing operation of the image forming apparatus 1501 that has received the print job is completed. Therefore, in the operation process, when the user who operates the mobile terminal 101 starts the print application 402 on the mobile terminal 101 and then the image forming apparatus 1501 is found and then selected by the user, the print job is transmitted to the image forming apparatus 1501.

However, in the third embodiment, after the operation process of FIG. 7 in the first embodiment is performed in the data processing system 100 according to the first embodiment, the mobile terminal 101 is moved from the data processing system 100 to the data processing system 1500, and then the operation process of FIG. 17 is performed. Therefore, the RAM 203 of the mobile terminal 101 stores the first list 901 of FIG. 9C in the first embodiment.

Since steps S1701 to S1707 are similar to steps S701 to S707 of the first embodiment, the description thereof is omitted. It should be noted that, in step S1703, a first list different from the first list 901 of FIG. 9C in the first embodiment is generated. In addition, in a case where an image forming apparatus compatible with only BLE is present around the mobile terminal 101 in addition to the image forming apparatus 1501 in the data processing system 1500, the processing in steps S1704 to S1706 is performed on each image forming apparatus compatible with only BLE.

The processing of steps S704 to S707 is repeatedly executed, and when a certain period of time has elapsed since the last storage into the first list 901, the process proceeds to step S1708. In step S1708, the CPU 201 of the mobile terminal 101 refers to the first list generated in step S1703 and after the processing of step S1707. Accordingly, in a case where the CPU 201 of the mobile terminal 101 determines that there is no image forming apparatus compatible with BLE and UWB around the mobile terminal 101, the process proceeds to step S1709. It should be noted that, in a case where it is determined that there is an image forming apparatus compatible with BLE and UWB around the mobile terminal 101, although not illustrated, the operation process of FIG. 17 ends.

In step S1709, the CPU 201 (constant calculation unit) of the mobile terminal 101 performs constant calculation for the value of the constant N unique to the mobile terminal 101. Therefore, the CPU 201 of the mobile terminal 101 reads, from the first list 901 of FIG. 9C in the first embodiment, the value of the RSSI of BLE and the result of the UWB distance measurement for the image forming apparatus for which the result of the UWB distance measurement is the smallest among the image forming apparatuses compatible with BLE and UWB. Specifically, the CPU 201 of the mobile terminal 101 reads, from the first list 901 of FIG. 9C, the value of the RSSI of BLE and the result of the UWB distance measurement for the image forming apparatus 103 for which the result of the UWB distance measurement is the smallest among the image forming apparatuses 102 and 103 compatible with BLE and UWB. Further, the CPU 201 of the mobile terminal 101 substitutes the read value of the RSSI of BLE, the read result of the UWB distance measurement, and the environmental variable n=2 into Equation 1601 to perform constant calculation for the value of the constant N unique to the mobile terminal 101.

It should be noted that the value of the constant N unique to the mobile terminal 101 may be calculated using Equation 1005. In this case, the values of the transmission gain $G_T$ and the transmission power $P_T$ of the image forming apparatus 103, for which the result of the UWB distance measurement is smaller, the value of the reception gain $G_R$ of the mobile terminal 101, the environmental variable n=2, and the wavelength $\lambda$=0.12 are substituted into Equation 1005, whereby the value of the constant N unique to the mobile terminal 101 is calculated.

In step S1710, the CPU 201 of the mobile terminal 101 calculates the distance from the mobile terminal 101 to the image forming apparatus 1501 compatible with only BLE. Specifically, the CPU 201 of the mobile terminal 101 substitutes the value of N unique to the mobile terminal 101 calculated in step S1709 and the environmental variable n=2 in the ideal space, into Equation 1007, thereby deriving a distance calculation equation for an image forming apparatus compatible with only BLE. Further, the CPU 201 of the mobile terminal 101 calculates the distance from the mobile terminal 101 to the image forming apparatus 1501 by substituting the value of the RSSI of BLE of the image forming apparatus 1501 into the derived distance calculation equation for the image forming apparatus compatible with only BLE.

In step S1711, the CPU 201 of the mobile terminal 101 stores the distance calculated in step S1710 into the first list generated in step S1703. It should be noted that, in a case where an image forming apparatus compatible with only BLE is present around the mobile terminal 101 in addition to the image forming apparatus 1501 in the data processing system 1500, the processing in steps S1710 to S1711 is performed on each image forming apparatus compatible with only BLE. Thereafter, the process proceeds to step S1712. Since steps S1712 to S1717 are similar to steps S714 to S719 of the first embodiment, the description thereof is omitted. After the processing of step S1717 is performed, the operation process of FIG. 17 ends.

As described above, in the third embodiment, in a case where the mobile terminal 101 carried by the user moves from the data processing system 100, in which the print application 402 is normally executed, to the data processing system 1500, the operation process of FIG. 17 is performed. As a result, even if the data processing system 1500 is in an environment where only the image forming apparatus 1501 compatible with only BLE is present around the mobile terminal 101, the distance from the mobile terminal 101 to the image forming apparatus 1501 compatible with only BLE can be calculated with accuracy higher than the accuracy of BLE distance measurement.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-093243, filed Jun. 6, 2023, which is hereby incorporated by reference wherein in its entirety.

What is claimed is:

1. A data processing system comprising a first image forming apparatus, a second image forming apparatus, and a mobile terminal, wherein the first image forming apparatus is configured to perform, with the mobile terminal, first wireless communication and second wireless communication for performing distance measurement with accuracy higher than accuracy in the first wireless communication, the second image forming apparatus is configured to perform, with the mobile terminal, the first wireless communication, and not to perform the second wireless communication, and the mobile terminal comprises one or more controllers configured to function as:

a distance calculation unit configured to substitute received radio wave intensity of the second image forming apparatus in the first wireless communication between the mobile terminal and the second image forming apparatus, into a distance calculation equation which is based on the received radio wave intensity of the first image forming apparatus in the first wireless communication and on a result of distance measurement by the second wireless communication performed between the mobile terminal and the first image forming apparatus, thereby calculating a distance from the mobile terminal to the second image forming apparatus; and a deriving unit configured to:

acquire received radio wave intensity of the first image forming apparatus in the first wireless communication between the mobile terminal and the first image forming apparatus, and acquire a result of distance measurement by the second wireless communication between the mobile terminal and the first image forming apparatus; and derive the distance calculation equation for calculating a distance from the mobile terminal to the second image forming apparatus by using the acquired received radio wave intensity of the first wireless communication and the acquired result of distance measurement by the second wireless communication, while excluding the first image forming apparatus for which the result of distance measurement by the second wireless communication is equal to or greater than a threshold value.

2. The data processing system according to claim 1, wherein the one or more controllers of the mobile terminal are further configured to function as:

a display unit configured to display a distance from the mobile terminal to the first image forming apparatus together with information on the first image forming apparatus, the distance being the result of distance measurement by the second wireless communication; and display the distance from the mobile terminal to the second image forming apparatus together with information on the second image forming apparatus, the distance being calculated by the distance calculation unit; and a selection unit configured to be used by a user to select an image forming apparatus to be caused to perform printing based on a print job in the mobile terminal from among the first image forming apparatus and the second image forming apparatus in which distances from the mobile terminal are displayed by the display unit.

3. The data processing system according to claim 2, wherein in the mobile terminal, the display unit displays the distance from the mobile terminal to the second image forming apparatus, the distance being calculated by the distance calculation unit, together with a mark indicating that the displayed distance is obtained by calculation by the distance calculation unit.

4. The data processing system according to claim 2, wherein the one or more controllers of the mobile terminal are further configured to function as:

a change unit configured to allow a user to change a display order of distances displayed by the display unit.

5. The data processing system according to claim 1, wherein in the mobile terminal, the deriving unit derives the distance calculation equation based on a Friis transmission equation.

6. The data processing system according to claim 5, wherein in the mobile terminal, in a case where there is one first image forming apparatus, the deriving unit derives the distance calculation equation assuming that a value of an environmental variable of the Friis transmission equation is "environmental variable=2".

7. The data processing system according to claim 5, wherein in the mobile terminal, in a case where there are three or more first image forming apparatuses, the deriving unit uses the received radio wave intensities of the first wireless communication and the results of distance measurement by the second wireless communication for two first image forming apparatuses to derive the distance calculation equation, wherein the two first image forming apparatuses include a first image forming apparatus for which the result of distance measurement by the second wireless communication is the smallest and a first image forming apparatus for which the result of distance measurement by the second wireless communication is the second smallest.

8. The data processing system according to claim 5, wherein the one or more controllers of the mobile terminal are further configured to function as:

a constant calculation unit configured to use the received radio wave intensity of the first wireless communication and the result of distance measurement by the second wireless communication for the first image forming apparatus for which the result of distance measurement by the second wireless communication is the smallest and use "environmental variable=2" assumed as a value of the environmental variable of the Friis transmission equation, and calculate a constant unique to the mobile terminal, wherein in the mobile terminal, in a case where the mobile terminal moves to an environment where only a third image forming apparatus capable of the first wireless communication and incapable of the second wireless communication is present, the distance calculation unit substitutes a received radio wave intensity of the third image forming apparatus in the first wireless communication between the mobile terminal and the third image forming apparatus, a constant unique to the mobile terminal, and the "environmental variable=2" into the distance calculation equation, and calculate a distance from the mobile terminal to the third image forming apparatus.

9. The data processing system according to claim 1, wherein the first wireless communication is wireless communication via Bluetooth (registered trademark) Low Energy (BLE).

10. The data processing system according to claim 1, wherein the second wireless communication is wireless communication via an Ultra Wide Band (UWB).

11. The data processing system according to claim 1, wherein the mobile terminal is a smartphone or a tablet terminal.

12. A control method for a data processing system comprising a first image forming apparatus, a second image forming apparatus, and a mobile terminal, wherein the first image forming apparatus is configured to perform, with the mobile terminal, first wireless communication and second wireless communication for performing distance measurement with accuracy higher than accuracy in the first wireless communication, the second image forming apparatus is configured to perform, with the mobile terminal, the first wireless communication, and not to perform the second wireless communication, and the control method comprises the following steps to be performed in the mobile terminal:

a distance calculation step of substituting received radio wave intensity of the second image forming apparatus in the first wireless communication between the mobile terminal and the second image forming apparatus, into a distance calculation equation which is based on the received radio wave intensity of the first image forming apparatus in the first wireless communication and on a result of distance measurement by the second wireless communication performed between the mobile terminal and the first image forming apparatus, thereby calculating a distance from the mobile terminal to the second image forming apparatus; and a derivation step of acquiring received radio wave intensity of the first image forming apparatus in the first wireless communication between the mobile terminal and the first image forming apparatus, and acquiring a result of distance measurement by the second wireless communication between the mobile terminal and the first image forming apparatus; and deriving the distance calculation equation for calculating a distance from the mobile terminal to the second image forming apparatus by using the acquired received radio wave intensity of the first wireless communication and the acquired result of distance measurement by the second wireless communication, while excluding the first image forming apparatus for which the result of distance measurement by the second wireless communication is equal to or greater than a threshold value.

13. A computer-readable non-transitory storage medium storing a program for causing a computer to execute a control method for a data processing system, the data processing system comprising a first image forming apparatus, a second image forming apparatus, and a mobile terminal, wherein the first image forming apparatus is configured to perform, with the mobile terminal, first wireless communication and second wireless communication for performing distance measurement with accuracy higher than accuracy in the first wireless communication, the second image forming apparatus is configured to perform, with the mobile terminal, the first wireless communication, and not to perform the second wireless communication, and the control method comprises the following steps to be performed in the mobile terminal:

a distance calculation step of substituting received radio wave intensity of the second image forming apparatus in the first wireless communication between the mobile terminal and the second image forming apparatus, into a distance calculation equation which is based on the received radio wave intensity of the first image forming apparatus in the first wireless communication and on a result of distance measurement by the second wireless communication performed between the mobile terminal and the first image forming apparatus, thereby calculating a distance from the mobile terminal to the second image forming apparatus; and a derivation step of acquiring received radio wave intensity of the first image forming apparatus in the first wireless communication between the mobile terminal and the first image forming apparatus, and acquiring a result of distance measurement by the second wireless communication between the mobile terminal and the first image forming apparatus; and deriving the distance calculation equation for calculating a distance from the mobile terminal to the second image forming apparatus by using the acquired received radio wave intensity of the first wireless communication and the acquired result of distance measurement by the second wireless communication, while excluding the first image forming apparatus for which the result of distance measurement by the second wireless communication is equal to or greater than a threshold value.

* * * * *